(12) United States Patent
Kang et al.

(10) Patent No.: US 10,275,200 B2
(45) Date of Patent: Apr. 30, 2019

(54) ACTIVITY INFORMATION PROCESSING METHOD AND ELECTRONIC DEVICE SUPPORTING THE SAME

(71) Applicant: Samsung Electronics Co., Ltd., Gyeonggi-do (KR)

(72) Inventors: Jeong Gwan Kang, Gyeonggi-do (KR); Byung Jun Lee, Gyeonggi-do (KR); Yun Hwa Seo, Gyeonggi-do (KR); Sun Young Park, Gyeonggi-do (KR); Seung Hyuck Shin, Gyeonggi-do (KR); Hyun Su Hong, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 195 days.

(21) Appl. No.: 15/227,042

(22) Filed: Aug. 3, 2016

(65) Prior Publication Data
US 2017/0046108 A1 Feb. 16, 2017

(30) Foreign Application Priority Data

Aug. 13, 2015 (KR) .......................... 10-2015-0114802

(51) Int. Cl.
*G06F 1/26* (2006.01)
*G06F 3/14* (2006.01)
(Continued)

(52) U.S. Cl.
CPC ............ *G06F 3/14* (2013.01); *A63B 24/0062* (2013.01); *G06F 1/263* (2013.01); *G06F 3/0346* (2013.01); *G06F 3/0481* (2013.01); *G06Q 10/00* (2013.01)

(58) Field of Classification Search
CPC ........ G06F 3/14; G06F 3/0346; G06F 3/0481; A63B 24/0062; A63B 2024/0071; A63B 2024/0068; G06Q 10/00; H04L 67/22
See application file for complete search history.

(56) References Cited

U.S. PATENT DOCUMENTS

| 8,831,407 B2 | 9/2014 | Meschter et al. |
| 8,936,552 B2 | 1/2015 | Kateraas et al. |

(Continued)

FOREIGN PATENT DOCUMENTS

| EP | 2 868 273 A1 | 5/2015 |
| EP | 2 869 539 A2 | 5/2015 |

(Continued)

OTHER PUBLICATIONS

International Search Report, dated Nov. 16, 2016.
(Continued)

*Primary Examiner* — Jeffrey A Gaffin
*Assistant Examiner* — Bille M Dahir
(74) *Attorney, Agent, or Firm* — Cha & Reiter, LLC

(57) ABSTRACT

An electronic device may measure a user's exercise or other activity and output intuitive information regarding the activity. The electronic device may include a sensor that senses a movement of the electronic device. A processor may determine types of activity states of specified unit times, and determine a specific activity state as a representative activity state of a specified time range based on distribution of the activity states of the specified unit times. The processor may output information corresponding to a determined representative activity state. Short bursts of secondary activity which occur during the specified time range may be omitted in the output information.

20 Claims, 18 Drawing Sheets

(51) Int. Cl.
*A63B 24/00* (2006.01)
*G06Q 10/00* (2012.01)
*G06F 3/0346* (2013.01)
*G06F 3/0481* (2013.01)

(56) References Cited

U.S. PATENT DOCUMENTS

| | | | |
|---|---|---|---|
| 8,948,783 | B2 | 2/2015 | Pennanen et al. |
| 9,118,725 | B2 | 8/2015 | Pennanen et al. |
| 9,125,015 | B2 | 9/2015 | Pennanen et al. |
| 9,174,084 | B2 | 11/2015 | Morris et al. |
| 9,255,942 | B2 | 2/2016 | Takahashi |
| 9,389,057 | B2 | 7/2016 | Meschter et al. |
| 2002/0151810 | A1 | 10/2002 | Wong et al. |
| 2011/0152637 | A1 | 6/2011 | Kateraas et al. |
| 2012/0251079 | A1 | 10/2012 | Meschter et al. |
| 2013/0325392 | A1 | 12/2013 | Takahashi |
| 2013/0325399 | A1 | 12/2013 | Yuen et al. |
| 2014/0229220 | A1 | 8/2014 | Yuen et al. |
| 2014/0235275 | A1 | 8/2014 | Yuen et al. |
| 2014/0257533 | A1* | 9/2014 | Morris ............ A61B 5/7264 700/91 |
| 2014/0375817 | A1 | 12/2014 | Meschter et al. |
| 2015/0004998 | A1 | 1/2015 | Pennanen et al. |
| 2015/0005030 | A1 | 1/2015 | Pennanen et al. |
| 2015/0073235 | A1 | 3/2015 | Kateraas et al. |
| 2015/0100245 | A1 | 4/2015 | Huang et al. |
| 2015/0100643 | A1 | 4/2015 | Pennanen et al. |
| 2015/0124367 | A1 | 5/2015 | Kim |
| 2015/0127298 | A1 | 5/2015 | Gangumalla et al. |
| 2015/0169659 | A1* | 6/2015 | Lee .................. G06Q 10/10 707/746 |
| 2015/0253120 | A1 | 9/2015 | Meschter et al. |
| 2015/0288772 | A1* | 10/2015 | Molettiere .......... H04L 67/22 715/736 |
| 2015/0326709 | A1 | 11/2015 | Pennanen et al. |
| 2016/0074706 | A1 | 3/2016 | Morris et al. |

FOREIGN PATENT DOCUMENTS

| | | |
|---|---|---|
| KR | 10-2015-0038498 A | 4/2015 |
| WO | 2014/209697 A1 | 12/2014 |

OTHER PUBLICATIONS

European Search Report, dated Dec. 9, 2016.
European Search Report dated Feb. 16, 2018.
Anonymous; "Running—Wikipedia", Jul. 29, 2015; XP055489845; Retrieved from URL: https://en.wikipedia.org/w/index.php?title=running&oldid=673685427.
Anonymous; "List of world records in masters athletics—Wikipedia", Aug. 12, 2015; XP055489850; Retrieved from URL: https://en.wikipedia.org/w/index.php?title=List_of_world_records_in_masters_athletics&oldid=675820866.
European Search Report dated Jul. 19, 2018.

* cited by examiner

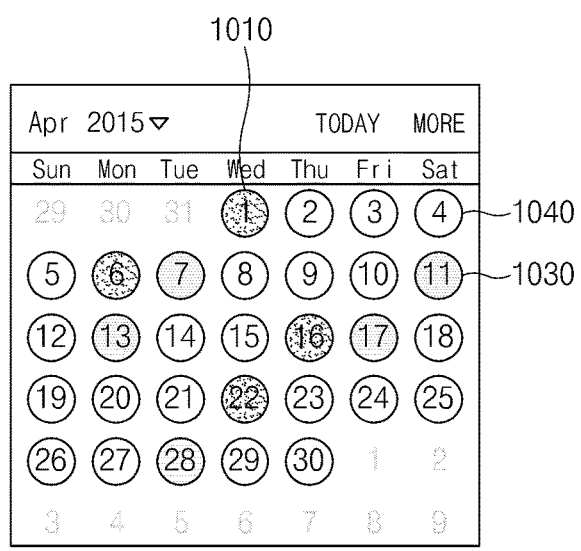
F I G . 10

| MALE | 168cm | | | | | | | | | | | |
|---|---|---|---|---|---|---|---|---|---|---|---|---|
| PER-MINUTE-BASED Batch Result | | | | | Session Result | | | | | | | |
| HR | MIN | SEC | timestamp | | HR | MIN | SEC | timestamp | Activity | Confidence | Event | Duration |
| 14 | 25 | 32 | 1.4E+12 | 1 | 14 | 25 | 32 | 1.4E+12 | 1 | 0 | 1 | 0 |
| 14 | 26 | 17 | 1.4E+12 | 2 | | | | | | | | |
| 14 | 26 | 33 | 1.4E+12 | 2 | 14 | 26 | 33 | 1.4E+12 | 1 | 0 | 2 | 60759 |
| 14 | 27 | 33 | 1.4E+12 | 2 | 14 | 26 | 33 | 1.4E+12 | 2 | 2 | 1 | 0 |
| 14 | 29 | 7 | 1.4E+12 | 2 | | | | | | | | |
| 14 | 30 | 10 | 1.4E+12 | 2 | | | | | | | | |
| 14 | 31 | 11 | 1.4E+12 | 1 | | | | | | | | |
| 14 | 31 | 40 | 1.4E+12 | 2 | 14 | 31 | 40 | 1.4E+12 | 2 | 2 | 2 | 306839 |
| 14 | 32 | 10 | 1.4E+12 | 2 | 14 | 31 | 40 | 1.4E+12 | 1 | 0 | 1 | 0 |
| 14 | 32 | 11 | 1.4E+12 | 2 | 14 | 32 | 11 | 1.4E+12 | 1 | 0 | 2 | 31471 |
| 14 | 33 | 13 | 1.4E+12 | 2 | 14 | 32 | 11 | 1.4E+12 | 2 | 2 | 1 | 0 |
| 14 | 34 | 14 | 1.4E+12 | 2 | | | | | | | | |
| 14 | 35 | 14 | 1.4E+12 | 2 | | | | | | | | |
| 14 | 36 | 54 | 1.4E+12 | 1 | | | | | | | | |
| 14 | 37 | 31 | 1.4E+12 | 2 | 14 | 37 | 31 | 1.4E+12 | 2 | 2 | 2 | 319492 |
| 14 | 37 | 54 | 1.4E+12 | 2 | 14 | 37 | 31 | 1.4E+12 | 1 | 0 | 1 | 0 |
| 14 | 38 | 7 | 1.4E+12 | 2 | 14 | 38 | 7 | 1.4E+12 | 2 | 2 | 2 | 36135 |
| 14 | 38 | 54 | 1.4E+12 | 2 | 14 | 38 | 7 | 1.4E+12 | 1 | 0 | 1 | 0 |
| 14 | 40 | 23 | 1.4E+12 | 2 | | | | | | | | |
| 14 | 41 | 23 | 1.4E+12 | 2 | | | | | | | | |
| 14 | 42 | 24 | 1.4E+12 | 2 | | | | | | | | |
| 14 | 43 | 20 | 1.4E+12 | 1 | 14 | 43 | 24 | 1.4E+12 | 2 | 2 | 2 | 317710 |
| 14 | 43 | 24 | 1.4E+12 | 2 | 14 | 43 | 24 | 1.4E+12 | 1 | 0 | 1 | 0 |

| ACTUAL ACTIVITY | |
|---|---|
| STATE | DURATION |
| STATIONARY | |
| WALKING(90STEP/min) | 315 SEC |
| STATIONARY | |
| WALKING(100STEP/min) | 315 SEC |
| STATIONARY | |
| WALKING(110STEP/min) | 315 SEC |

FIG. 12

ACTIVITY INFORMATION PROCESSING METHOD AND ELECTRONIC DEVICE SUPPORTING THE SAME

CLAIM OF PRIORITY

This application claims the benefit under 35 U.S.C. § 119(a) of a Korean patent application filed on Aug. 13, 2015 in the Korean Intellectual Property Office and assigned Serial number 10-2015-0114802, the entire disclosure of which is hereby incorporated by reference.

TECHNICAL FIELD

The present disclosure relates generally to information processing related to user activity, and more particularly to portable electronic devices that measure and display exercise activity.

BACKGROUND

Recent electronic devices provide a user function of measuring and processing exercise information of a user.

An exercise-related user function provided by a typical electronic device requires a user to input commands indicating a start and an end of an exercise, but certain users may find this task frustrating. Moreover, there is often a significant difference between the amount of exercise measured by the device and the amount of exercise perceived by the user.

SUMMARY

An aspect of the present disclosure is to provide an activity information processing method for minimizing a difference between an activity actually sensed by a user and information provided by an electronic device by means of adaptive processing or weight-based processing of exercise-related information, and an electronic device supporting the same.

Another aspect of the present disclosure is to provide an activity information processing method for providing a user interface for enabling a user to easily and intuitively understand information on a user's activity state, and an electronic device supporting the same.

In accordance with an aspect of the present disclosure, an electronic device may include a housing, a sensor included in the housing and configured to sense a movement of the electronic device, and a processor electrically connected to the sensor. A memory may store instructions that, when executed by the processor, cause the processor to receive, from the sensor during a first time period, first sensing data indicating occurrence of a first activity of a user of the electronic device. The processor may receive, from the sensor during a second time period, second sensing data indicating occurrence of a second activity of the user. The processor may output information indicating that the first activity, but not the second activity, has occurred throughout a third time period encompassing the first and second time periods, if the processor determines that the first activity was the most prevalent activity throughout the third time period.

In accordance with another aspect of the present disclosure, an analogous activity information processing method is provided.

In another aspect, an electronic device may include a sensor that senses a movement of the electronic device. A processor may determine types of activity states of specified unit times, and determine a specific activity state as a representative activity state of a specified time range based on distribution of the activity states of the specified unit times. The processor may output information corresponding to a determined representative activity state. Short bursts of secondary activity which occur during the specified time range may be omitted in the output information. As a result, a more intuitive display of activity information may be provided.

BRIEF DESCRIPTION OF THE DRAWINGS

FIG. 10 is a diagram illustrating an example of a screen interface related to an activity state history according to an embodiment of the present disclosure.

FIG. 12 is a diagram illustrating session integration according to an embodiment of the present disclosure.

DETAILED DESCRIPTION

Figure 1:
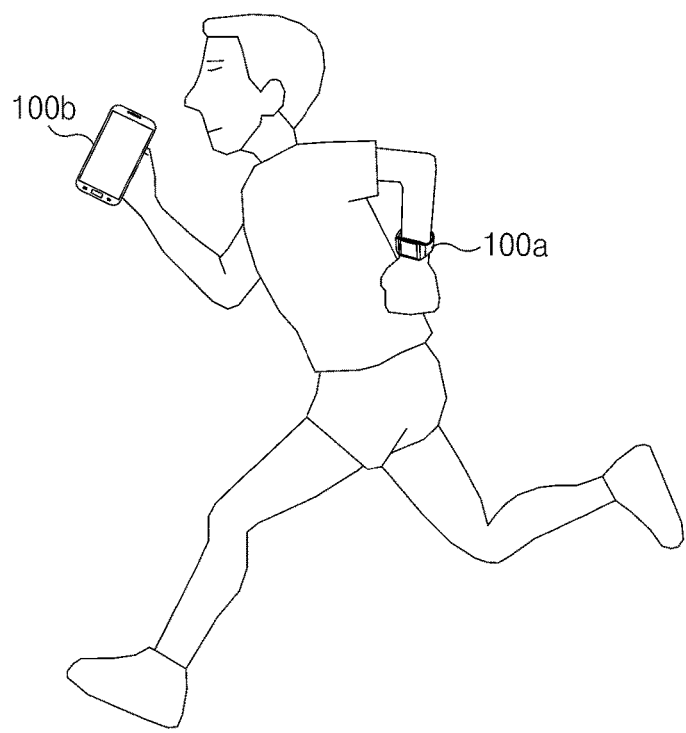
FIG. 1 is a diagram illustrating an example of an electronic device operating environment according to an embodiment of the present disclosure.

Hereinafter, various embodiments of the present disclosure will be described in detail with reference to the accompanying drawings. However, it should be understood that the present disclosure is not limited to specific embodiments, but rather includes various modifications, equivalents and/or alternatives of the embodiments of the present disclosure. Regarding description of the drawings, like reference numerals may refer to like elements.

The term "have", "may have", "include", "may include" or "comprise" used herein indicates the existence of a corresponding feature (e.g., a number, a function, an operation, or an element) and does not exclude the existence of an additional feature.

The term "A or B", "at least one of A and/or B", or "one or more of A and/or B" may include all possible combinations of items listed together with the term. For example, the term "A or B", "at least one of A and B", or "at least one of A or B" may indicate all the cases of (1) including at least one A, (2) including at least one B, and (3) including at least one A and at least one B.

The term "first", "second" or the like used herein may modify various elements regardless of the order and/or priority thereof, and is used only for distinguishing one element from another element, without limiting the elements. For example, "a first user device" and "a second user device" may indicate different user devices regardless of the order or priority. For example, without departing the scope of the present disclosure, a first element may be referred to as a second element and vice versa.

It will be understood that when a certain element (e.g., a first element) is referred to as being "operatively or communicatively coupled with/to" or "connected to" another element (e.g., a second element), the certain element may be coupled to the other element directly or via another element (e.g., a third element). However, when a certain element (e.g., a first element) is referred to as being "directly coupled" or "directly connected" to another element (e.g., a second element), there may be no intervening element (e.g., a third element) between the element and the other element.

The term "configured (or set) to" may be interchangeably used with the term, for example, "suitable for", "having the capacity to", "designed to", "adapted to", "made to", or "capable of". The term "configured (or set) to" may not necessarily have the meaning of "specifically designed to". In some cases, the term "device configured to" may indicate that the device "may perform" together with other devices or components. For example, the term "processor configured (or set) to perform A, B, and C" may represent a dedicated processor (e.g., an embedded processor) for performing a corresponding operation, or a generic-purpose processor (e.g., a CPU or an application processor) for executing at least one software program stored in a memory device to perform a corresponding operation.

The terminology used herein is only used for describing specific embodiments and is not intended to limit the scope of other embodiments. The terms of a singular form may include plural forms unless otherwise specified. The terms used herein, including technical or scientific terms, have the same meanings as understood by those skilled in the art. Terms defined in general dictionaries, among the terms used herein, may be interpreted as having meanings that are the same as or similar to contextual meanings defined in the related art, and should not be interpreted in an idealized or overly formal sense unless otherwise defined explicitly. Depending on cases, even the terms defined herein should not be such interpreted as to exclude various embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a Motion Picture Experts Group (MPEG-1 or MPEG-2) Audio Layer 3 (MP3) player, a mobile medical device, a camera, or a wearable device. According to various embodiments of the present disclosure, the wearable device may include at least one of an accessory-type device (e.g., a watch, a ring, a bracelet, an anklet, a necklace, glasses, a contact lens, a head-mounted device (HDM)), a textile- or clothing-integrated-type device (e.g., an electronic apparel), a body-attached-type device (e.g., a skin pad or a tattoo), or a bio-implantable-type device (e.g., an implantable circuit).

In some various embodiments of the present disclosure, an electronic device may be a home appliance. The home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller's machine (ATM), a point of sales (POS) of a store, or an Internet of things device (e.g., a bulb, various sensors, an electric or gas meter, a sprinkler, a fire alarm, a thermostat, a streetlamp, a toaster, exercise equipment, a hot water tank, a heater, a boiler, or the like).

According to some various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). In various embodiments of the present disclosure, an electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of technology.

Hereinafter, an electronic device according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 is a diagram illustrating an example of an electronic device operating environment according to an embodiment of the present disclosure. In this environment, a user may be in an activity state (or a motion state, a movement state, or the like) corresponding to at least one type of activity while carrying or gripping a first electronic device 100a and/or a second electronic device 100b. The activity state may include, for example, a stationary state in which there is no motion or a degree of a motion is equal to or lower than a specified reference value, a walking state, a running state, a cycle operating state, a vehicle using state, etc.

According to an embodiment of the present disclosure, the first electronic device 100a may collect sensor information (or sensing data) about the activity state of the user while being worn on the user's, hand, wrist, foot, ankle, neck, face, waist, or the like. The first electronic device 100a may determine whether an activity (or movement or motion) state change of at least a specified magnitude occurs on any of collected data points of the sensor information. If sensor information corresponding to occurrence of activity having a magnitude above a threshold and occurring for at least a specified time range (e.g., 5 minutes, 10 minutes, 20 minutes, or the like), is collected, the first electronic device 100a may perform activity classification (e.g., classifying the types of the activity state into a stationary state, a walking state, a running state, etc.) based on the collected sensor information. The first electronic device 100a may perform the activity state classification using a specified unit time (e.g., 30 seconds, 1 minute, 2 minutes, or the like) with respect to activity state periods. For example, the first electronic device 100a may determine a first type of activity state that is most prevalent among different types of activity states of specified unit times as a representative activity state of a corresponding time range. The first electronic device 100a may output the determined representative activity state as display information, audio information, vibration information, and/or or lamp information. The specified time range may be the sum of a default time range (e.g., 10 minutes) and an additional time range (e.g., 5 minutes) until which an activity state continues.

In various embodiments, the first electronic device 100a may collect pieces of sensor information for each session in response to arrival of a certain period or occurrence of a specified event (e.g., an event of changing a state of a processor from a sleep state to an awakened state, an event of turning on a display, an event of receiving an external input (e.g., a message, etc.), or the like). In an embodiment, the session information (or session) may include pieces of information divided based on a time at which an activity state is changed within a specified time range. The session information may include pieces of information obtained based on a time at which the specified event occurs or the certain period arrives. The first electronic device 100a may detect activity state changes based on a result of analysis on pieces of the session information, and may output information on changed activity states. In various embodiments, the first electronic device 100a may handle integration of collected session information with adjacent other session information according to a size of the collected session information. During a process of integrating session information, the first electronic device 100a may determine the most prevalent activity during the time period as being a representative activity for that period. That is, first device 100a may determine an activity state of session information having a relatively large amount (e.g., a relatively long time) of information as a representative activity state. The first electronic device 100a may output display information corresponding to the determined activity state. Based on this information, the first electronic device 100a may enable the user to intuitively understand the activity state thereof and recognize a situation with ease by virtue of simplified information.

The second electronic device 100b may collect sensor information while being gripped by the user, or may be mounted on or accommodated in a specific location (e.g., a certain part of a pedal or a wheel of a cycle, a bag, a pocket of clothes, etc.). The type of the second electronic device 100b may be the same as or similar to the type of the first electronic device 100a. The second electronic device 100b may be implemented as a portable electronic device. The portable electronic device may be implemented as, for example, a mobile phone, a smartphone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile Internet device (MID), an Internet tablet, an e-book, or the like.

The second electronic device 100b may analyze sensor information according to an activity state independently from or in cooperation with the first electronic device 100a, and may output a result of analysis. During this process, if sensor information corresponding to an activity which has a specified magnitude or more and a specified time range or longer, is collected, the second electronic device 100b may divide the activity state of the time range by a unit time. The second electronic device 100b may determine divided activity states of unit times based on sensor information for each unit time (e.g., determine according to what activity state—a stationary state, a walking state, a running state, a cycle operating state, a vehicle using state, etc.—corresponds to the sensor information for each unit time). The second electronic device 100b may gather results of determination, and may determine an activity state that is the most prevalent during the relevant period, i.e., activity state having a relatively high frequency (or an activity state having a relatively high weight) as a representative activity state. The second electronic device 100b may output representative activity state information as display information, audio information, vibration information, lamp information, or the like. In various embodiments, the second electronic device 100b may also transmit the representative activity state information to the first electronic device 100a. The second electronic device 100b may also receive the representative activity state information from the first electronic device 100a.

In various embodiments, the second electronic device 100b may divide continuously collected pieces of sensor information into pieces of session information (or sessions) according to a specified criterion (e.g., at least one of an activity state change, a certain period, or occurrence of an event) in a manner similar to that described above with respect to the first electronic device 100a. The second electronic device 100b may integrate divided sessions, may generate a new session, may generate a new temporary session, or may integrate temporary sessions based on a magnitude (e.g., a time length), continuity of the divided sessions, etc. The temporary session may include, for example, a session having a specified time length or shorter (e.g., having an activity duration time of 10 seconds or 20 seconds). The second electronic device 100b may determine an activity state based on sessions, and may output information (e.g., at least one of display information, audio information, vibration information, or lamp information) corresponding to a determined activity state.

Figure 2:
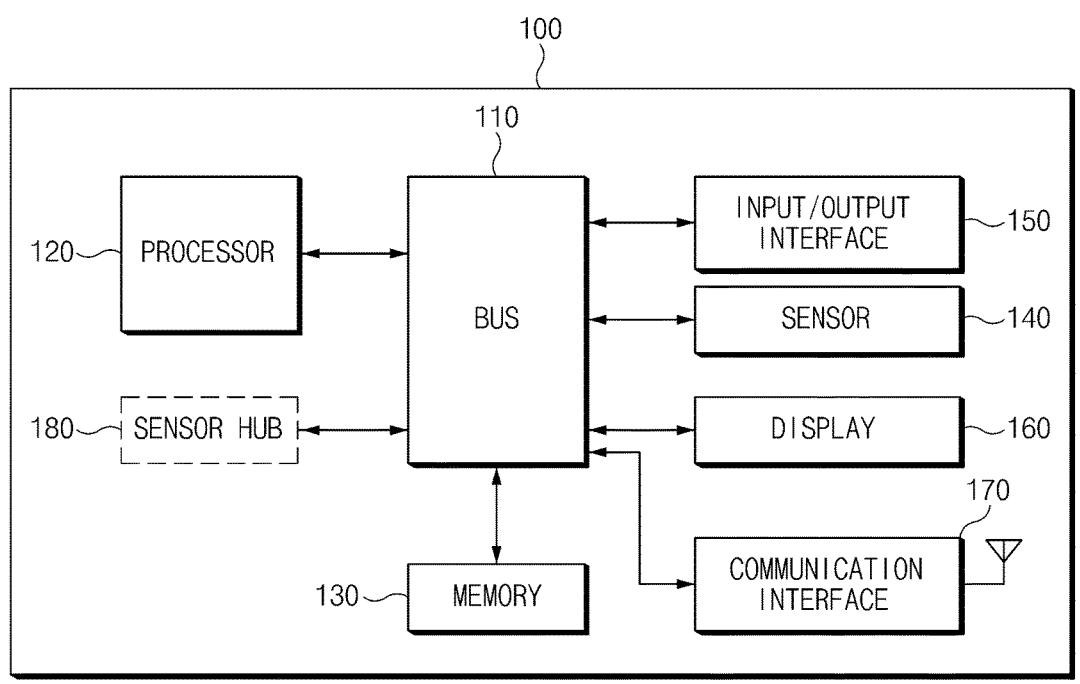
FIG. 2 is a diagram illustrating an example of a configuration of an electronic device according to an embodiment of the present disclosure.

FIG. 2 is a diagram illustrating an example of a configuration of an electronic device according to an embodiment of the present disclosure. An electronic device 100 (e.g., at least one of the first electronic device 100a or the second electronic device 100b) may include a bus 110, a processor 120, a memory 130, a sensor 140, an input/output interface 150, a display 160, and a communication interface 170. According to various embodiments of the present disclosure, the electronic device 100 may further include a sensor hub 180.

The electronic device 100 may collect sensor information corresponding to an activity state of a user using the sensor 140, and may determine user's activity states of unit times for a time range of collected sensor information. The electronic device 100 may determine at least one of the user's activity states of the unit times as a representative activity state according to a specified condition. The electronic device 100 may output information corresponding to a determined representative activity state. The electronic device 100 may exclude other temporary activity states (e.g., a state in which the user temporarily walks or pauses during a running activity state) which may occur in a specific activity state by providing the representative activity state, so as to minimize a user's sense of discrepancy when viewing subsequently displayed information with respect to a specific continuous activity state. Thus, even though short bursts of secondary activity may be intermingled with a main activity over a given timeframe, information representing just the main activity may be displayed as a representative activity for that timeframe.

The bus 110, for example, may support a signal transfer system for the elements of the electronic device 100. For example, the processor 120 may transfer a control signal to the sensor 140 via the bus 110, and sensor information of the sensor 140 may be transferred to the processor 120 via the bus 110. The processor 120 may transfer, to at least one of the input/output interface 150 or the display 160, specified information to be output, via the bus 110.

The processor 120 may control overall operation of the electronic device 100. According to an embodiment of the present disclosure, the processor 120 may be implemented with an integrated circuit, a system on chip, or a mobile AP. The processor 120 may determine an activity state based on sensor information collected by the specified sensor 140 (e.g., an acceleration sensor, a passometer, a pedometer, or the like). In the case where a specified activity state (e.g., walking, running, or cycling), among determined activity states, is maintained for at least a specified time, the processor 120 may perform an integration process with respect to activity states.

According to an embodiment of the present disclosure, in the case where sensor information corresponding to at least one specified activity state (e.g., walking, running, or the like) occurs (e.g., occurrence of a session of a specified range) for at least 10 minutes (e.g., 13 minutes), the processor 120 may analyze divided units of the sensor information by a certain unit time (e.g., 1 minute). The processor 120 may determine what activity state is indicated by a user's activity state of each unit time. The processor 120 may determine an activity state which occurs relatively frequently among all activity states of unit times as a representative activity state. For example, if sensor information having a length of 13 minutes is collected, the processor 120 may analyze an activity state for each minute so that the processor 120 may determine a walking activity state as a representative activity state of the 13-minute sensor information in the case where there are 11 values indicating a walking activity state and there are two values indicating a running activity state. The processor 120 may output information corresponding to a determined representative activity state.

In various embodiments, in the case where sensor information corresponding to at least one specified activity state (e.g., walking, running, or the like) occurs at least for a specified time range (e.g., about 10 minutes), the processor 120 may divide pieces of sensor information, which have occurred, by a session unit (e.g., an activity state unit). The processor 120 may determine an activity state which has a relatively large amount of activity (e.g., a traveled distance, consumed calories, or the like) among all activity states of unit sessions as a representative activity state. For example, if sensor information is collected, the processor 120 may analyze an activity state, and may determine a running activity state as a representative activity state of 13-minute sensor information in the case where a traveled distance is about 500 m in a walking activity state and a traveled distance is about 2 km in the running activity state. The processor 120 may output information corresponding to a determined representative activity state.

In various embodiments, the processor may perform session division based on sensor information obtained in real time. For example, the processor 120 may group pieces of sensor information obtained at a specified period (e.g., 20 minutes) as one session, or may divide a plurality of activity states (e.g., a stationary state, a walking state, a running state, etc.) within a specified period by a session. Alternatively, the processor 120 may divide pieces of sensor information into a previous session and a current session based on occurrence of a specified event (e.g., an event of turning on the display 160, occurrence of an external input, occurrence of an information request from a specific application, etc.). The processor 120 may determine a session having a smaller size than a specified size as a temporary session, and may integrate the temporary session with another temporary session, or, according to whether a previously stored temporary session exists, may store the temporary session as a new temporary session or may integrate the temporary session with the previously stored temporary session. During an integration process, the processor 120 may determine an activity state of a session having a relatively long time range (or relatively long traveled distance) as a representative activity state, and may output information based on the representative activity state.

The memory 130 may store at least one program related to operation of the electronic device 100 and data related to operation of a program. According to an embodiment of the present disclosure, the memory 130 may store an operating system of the electronic device 100. The memory 130 may store an activity state handling program. The activity state handling program may store an instruction set (or a program, a routine, a class, or the like) for monitoring whether sensor information corresponding to an activity state having a higher magnitude than a specified magnitude (e.g., an activity state of movement at a higher speed than a walk speed) occurs for at least a specified time range, an instruction set for dividing pieces of sensor information which have occurred for at least a specified time range by a unit time, an instruction set for determining an activity state of each unit time, an instruction set for determining an activity state which relatively frequently occurs as a representative activity state of at least the specified time range by integrating the activity states of the unit times, and an instruction set for outputting information corresponding to the representative activity state.

According to various embodiments of the present disclosure, the activity state handling program may include an instruction set for dividing pieces of sensor information obtained in real time by a session according to an event (e.g., an event occurring at a fixed period, an event of turning on a display, an event of receiving an external input, an event of receiving a request from a specified application, etc.), an instruction set for handling integration of temporary sessions according to sizes of divided sessions, and an instruction set for handling integration of normal sessions according to the session sizes. The integration handling instruction set may include an instruction subset for dividing a session (a temporary session or a normal session) by a unit time (or a unit distance) and determining activity states of divided unit sessions and an instruction subset for determining a representative activity state of a corresponding session according to relative frequencies of the activity states of the unit sessions.

The sensor 140 may include at least one sensor module capable of collecting sensor information according to a user's activity state. For example, the sensor 140 may include an acceleration sensor, a location information collecting sensor, etc. Furthermore, the sensor 140 may include a passometer, a pedometer, etc. Sensor information collected by the sensor 140 may be used to classify activity states into a stationary state, walking, running, cycling, using a vehicle, etc. according to the number of steps per unit time, a traveled distance per unit time, or according to whether a specified pattern is detected. The sensor 140 may also collect sensor information indicating whether the electronic device 100 is worn, and may transfer the sensor information to the processor 120.

The input/output interface 150 may serve to transfer an instruction or data input from a user or another external device to another element(s) of the electronic device 100. Furthermore, the input/output (I/O) interface 150 may output an instruction or data received from another element(s) of the electronic device 100 to the user or another external device. I/O 150 may include, for example, at least one physical button or touch button or a touchpad or a touch screen. Furthermore, I/O interface 150 may include a means for input by an electronic pen or the like. Moreover, I/O interface 150 may include an audio collecting device capable of collecting audio signals. I/O interface 150 may output, to an audio device, audio information corresponding to a representative activity state. I/O interface 150 may output vibration information, lamp flickering information, or the like corresponding to a representative activity state via a vibration device, a lamp, or the like.

The display 160 may be implemented with a thin-film transistor liquid crystal display (TFT-LCD) panel, a light emitting diode (LED) panel, an organic LED (OLED) panel, an active matrix OLED (AMOLED) panel, a flexible panel, or the like. The display 160 may output an execution screen according to execution of a specified application. For example, if sensor information corresponding to a specified activity state is collected for at least a specified time range while the display 160 is turned off, the display 160 may be temporarily turned on and then may output information corresponding to a change of an activity state. According to various embodiments of the present disclosure, the display 160 may output information corresponding to activity state changes accumulated in units of a certain time period (e.g., one day, three days, one week, one month, three month, six months, one year, etc.). The display 160 may be automatically turned off if a specified time elapses after the information is output.

The communication interface 170 may establish a communication channel related to a communication function of the electronic device 100. According to an embodiment of the present disclosure, the electronic device 100 may receive sensor information from an external electronic device (e.g., the second electronic device 100b or the first electronic device 100a). The communication interface 170 may transfer received sensor information to the processor 120. Accordingly, the processor 120 may output an activity state change and representative activity state information for the received sensor information. Communication interface 170 may transmit sensor information collected by the sensor 140 to an external electronic device (e.g., from the first electronic device 100a to the second electronic device 100b or vice versa) in response to control by the processor 120. Communication interface 170 may transmit or receive, to or from an external electronic device, activity state change information or representative activity state information. In this case, the processor 120 may perform an information output function corresponding to received activity state change information or representative activity state information.

The sensor hub 180 may serve to process activity information in response to control by the processor 120 or while the processor 120 is in an idle period. The idle period, in which the processor 120 is operated at a specified rate or lower, may include a period in which the processor 120 is driven with low power or a period in which a specified number or less of processes are performed.

Sensor hub 180 may temporarily store sensor information collected by the sensor 140. The sensor hub 180 may store sensor information while the processor 120 is in an idle state, and if stored sensor information has a certain size or larger, the sensor hub 180 may wake up the processor 120 and may transfer corresponding sensor information to the processor 120. According to various embodiments of the present disclosure, in the case where sensor information corresponding to a specific activity state (e.g., a stationary state or a vehicle using state) is maintained for a certain time, the sensor hub 180 may perform information compression. For example, the sensor hub 180 may only collect a start time and an end time of a stationary state and the type (e.g., a stationary state or a vehicle using state) for a corresponding time range, and may simplify information for specified unit times as information for a time between a start and an end. Alternatively, the sensor hub 180 may only collect one activity state (e.g., a vehicle using state) for a period between a start time and an end time or a distance between a start and an end without collecting activity state information for each specified unit time, thereby simplifying an information collecting operation.

Sensor hub 180 may transfer, to the processor 120, sensor information collected at a certain period. If the display 160 is changed from a turned-off state to a turned-on state, the sensor hub 180 may transfer, to the processor 120, sensor information collected until the display 160 is changed to the turned-on state. Upon receiving an input event (e.g., a message) from an external electronic device or the like, the sensor hub 180 may wake up the processor 120 and may transfer, to the processor 120, sensor information collected until the input event is received. The sensor hub 180 may transfer collected sensor information to the processor 120 in response to a request from a specified application (e.g., a healthcare application).

In various embodiments, if sensor information corresponding to a specified activity state (e.g., walking, running, cycling, or the like) occurs for a specified time (e.g., at least 10 minutes), the sensor hub 180 may wake up the processor 120 and may output a specified activity state alarm, or may output the specified activity state alarm independently from the processor 120 (e.g., while the processor 120 is in an idle state). If sensor hub 180 receives activity state change information and representative activity state information from the electronic device 100 or external electronic device, the sensor hub 180 may output a guide message corresponding to the received information to the display 160.

In other examples, electronic device 100 may not include the sensor hub 180 and may process activity information according to operation of the processor 120. Alternatively, the electronic device 100 may process activity information based on the sensor hub 180 while the processor 120 is in an idle period, and may transfer sensor information to the processor 120 when the processor 120 is active. In various embodiments, sensor hub 180 may be implemented as a dedicated processor for processing activity information.

Figure 3:
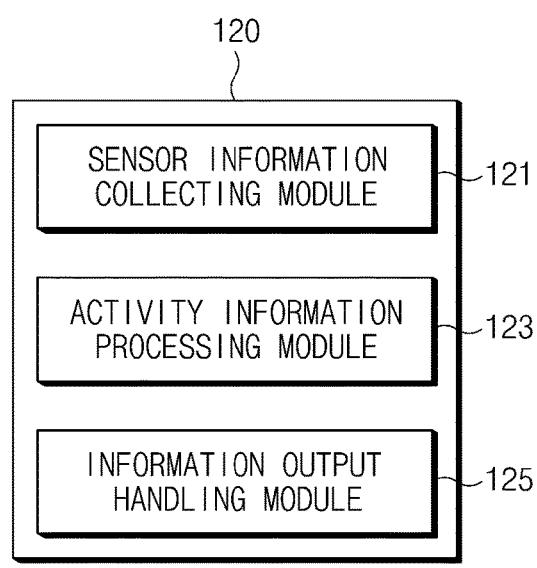
FIG. 3 is a diagram illustrating an example of a configuration of a sensor hub according to an embodiment of the present disclosure.

FIG. 3 is a block diagram illustrating an example of a configuration of a processor or sensor hub according to an embodiment of the present disclosure. In this example, processor 120 (or the sensor hub 180) may include a sensor information collecting module 121, an activity information processing module 123, and an information output handling module 125.

The sensor information collecting module 121 may collect sensor information by activating the sensor 140. Sensor information collecting module 121 may activate the sensor 140 if the electronic device 100 is worn, or may deactivate the sensor 140 if the electronic 113 device 100 is not worn. The sensor information collecting module 121, for example, may transfer acceleration sensor information, location sensor information, step number information, walked distance information, etc. to the activity information processing module 123. Sensor information collecting module 121 may also transfer, to the activity information processing module 123, sensor information including information on the number of steps per unit time (e.g., 1 second or 1 minute) and information on a walked distance per unit time (e.g., 1 second or 1 minute). Sensor information collecting module 121 may receive sensor information from an external electronic device via the communication interface 170. The sensor information collecting module 121 may transfer, to the activity information processing module 123, the sensor information received from the external electronic device.

The activity information processing module 123 may perform activity state classification based on sensor information transferred from the sensor information collecting module 121. For example, if the activity information processing module 123 receives sensor information, the activity information processing module 123 may determine whether sensor information having a value equal to or larger than that of a specified magnitude or movement (e.g., a speed or distance) occurs for at least a specified time. When sensor information having a value equal to or smaller than that of a specified movement is received, the activity information processing module 123 may not perform time counting. When sensor information having a value equal to or larger than that of a specified movement is received, the activity information processing module 123 may accumulate a time and may determine whether an accumulated time reaches at least a specified time. If at least the specified time elapses, the activity information processing module 123 may accumulate sensor information having a value equal to or larger than that of a specified movement.

If collecting the sensor information having a value equal to or larger than that of the specified movement is completed, the activity information processing module 123 may perform activity state handling for sensor information of an accumulated time. For example, the activity information processing module 123 may divide pieces of sensor information by a unit time, and may determine activity states of unit times. Activity information processing module 123 may determine an activity state as a walking activity state for certain unit times, and may determine the activity state as a stationary state for other certain unit times. Activity information processing module 123 may determine the activity state as a running activity state for certain unit times, and may determine the activity state as a walking or stationary state for other certain unit times. The activity information processing module 123 may determine an activity state corresponding to a relatively large amount of unit times as a representative activity state of the sensor information of the accumulated time. For example, in the case where an amount of unit times determined to correspond to a walking activity state is relatively larger than an amount of unit times determined to correspond to another activity state, the activity information processing module 123 may determine a walking activity state as a representative activity state of received sensor information.

After sensor information having a value equal to or larger than that of a specified movement is collected, the activity information processing module 123 may accumulatively collect sensor information having a value equal to or lower than that of a specified movement for a specified time. In the case where sensor information of a movement corresponding to a specified activity state (e.g., a walking state) is collected, and then the activity state is changed (e.g., changed into a running state) and a changed activity state is maintained for a specified time, the activity information processing module 123 may analyze accumulated sensor information for a previous activity state (e.g., a walking state).

Activity information processing module 123 may model sensor information characteristics of a specified range with respect to specific activity states. For example, the activity information processing module 123 may determine an activity state of currently collected sensor information based on sensor information modeling for a stationary state, sensor information modeling for a walking activity state, sensor information modeling for a running activity state, sensor information modeling for a cycling state, or sensor modeling for a vehicle using state. If a current activity state (e.g., a walking activity state) is changed to another activity state (e.g., a running, stationary, cycling, or vehicle using state), and then the other activity state is maintained for a specified time, the activity information processing module 123 may perform handling related to determination of an activity state prior to the change (e.g., handling for determining a representative activity state based on activity states of unit times).

Activity information processing module 123 may collect sessions in response to occurrence of events, and may provide an activity state change by processing collected sessions. For example, the activity information processing module 123 may collect accumulated sensor information as session information according to at least one of a certain period arrival event, a turn-on state change event of the display 160, an event of receiving an external input, or an event of receiving a request from a specified application. Activity information processing module 123 may also receive session information from the sensor hub 180 in response to occurrence of the above-mentioned events. The activity information processing module 123 may integrate a received session with a previous session or may treat the received session as a new session according to a time range size of received session information and activity state homogeneity of the received session information with previous session information. During a session integration process, the activity information processing module 123 may determine an activity state of a session having a relatively longer time as a representative activity state of an integrated session. The activity information processing module 123 may transfer pieces of determined activity state information to the information output handling module 125. According to the above-mentioned embodiments of the present disclosure, the activity information processing module 123 may divide collection of continuous sensor information by a specified period (or in response to occurrence of a specified event), and may analyze sensor information during a corresponding period. In this operation, the activity information processing module 123 may integrate pieces of sensor information into one session or may generate a new session based on an activity state of a previous time range and an activity state and time length of currently obtained sensor information at a division boundary region.

The information output handling module 125 may output at least one of display information, audio information, vibration information, or lamp information corresponding to an activity state transferred from the activity information processing module 123. Module 125 may output an activity state change during a specified time (e.g., 24 hours, one week, or one month). Module 125 may differentially output a stationary state, an exercise activity state (e.g., walking, running, cycling, or the like), a state in which the electronic device 100 is not worn, and a normal state including an exercise activity of not longer than a specified time.

Figure 4:
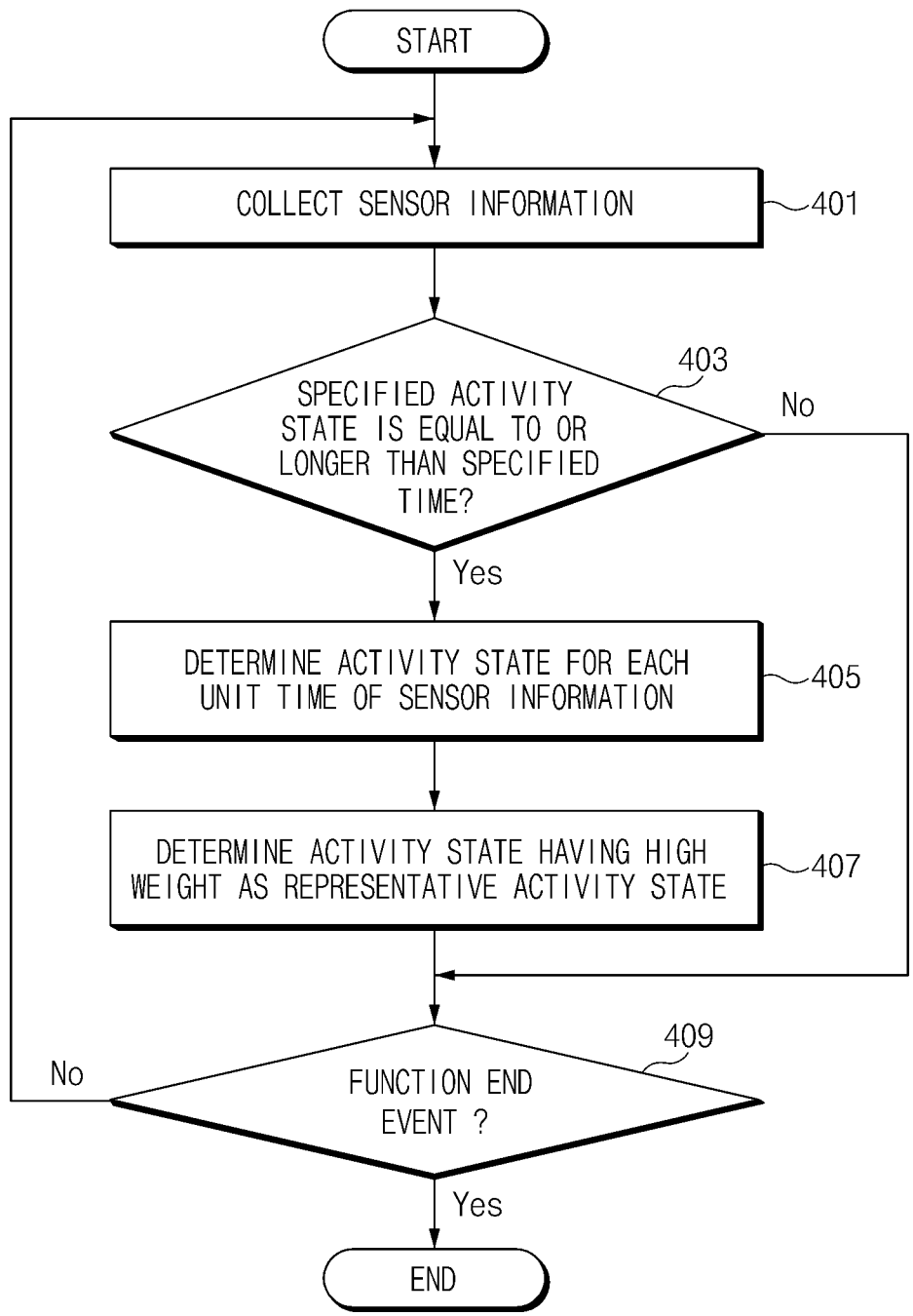
FIG. 4 is a diagram illustrating an example of an activity information processing method according to an embodiment of the present disclosure.

FIG. 4 is a diagram illustrating an example of an activity information processing method according to an embodiment of the present disclosure. In operation 401, the electronic device 100 (e.g., the sensor information collecting module 121) may collect sensor information. In relation to this operation, the processor 120 and the sensor 140 of the electronic device 100 may be activated, and sensor information may be collected continuously or at a certain period. Alternatively, in the case where there is no additional request, the electronic device 100 may allow the processor 120 to enter an idle period, and may collect sensor information based on the sensor hub 180.

In operation 403, the electronic device 100 (e.g., the processor 120) may determine whether a specified activity state occurs for at least a specified time. For example, the electronic device 100 may activate the sensor 140 in real time or at a certain period, and may monitor received sensor information so as to determine whether sensor information equal to or larger than a specified magnitude (e.g., sensor information according to a movement having a value equal to or larger than that of a walking activity or a movement having a value equal to or larger than that of a cycling activity) is collected. If sensor information corresponding to an activity equal to or larger than a specified magnitude occurs, the electronic device 100 may determine whether occurrence of the sensor information is maintained for at least a specified time. In the case where specific sensor information corresponding to an activity equal to or larger than a specified magnitude is not maintained for at least a specified time, the electronic device 100 may skip operation 405 or 407.

If the specific sensor information is maintained for at least a specified time, the electronic device 100 (e.g., the activity information processing module 123) may divide the specific sensor information by a unit time, and may determine an activity state for each unit time in operation 405. For example, the electronic device 100 may divide the specific sensor information in units of minutes or seconds (e.g., 10 seconds, 20 seconds, etc.), and may determine what activity state corresponds to sensor information of a corresponding time range. If activity states of unit times are determined, the electronic device 100 may gather determined activity states and may determine a representative activity state. Electronic device 100 may determine an activity state having a relatively high occurrence as a representative activity state. The activity state that is most prevalent within a given timeframe may be determined as the representative activity state for that timeframe. Thus, if short bursts of a secondary activity occur within a timeframe during which a main activity mostly occurs, the secondary activity may be ignored in a subsequent display of information characterizing that timeframe.

In operation 409, the electronic device 100 (e.g., the activity information processing module 123) may determine whether a function end event occurs. If the function end event does not occur, the process may return to operation 401 so that the electronic device 100 may re-perform operation 401 and the following operations. When the function end event occurs, the electronic device 100 may end an activity information processing function.

In operation 403, the electronic device 100 (e.g., the activity information processing module 123) may adaptively handle changes of activity states. For example, the user may walk for 13 minutes, may run 15 minutes, and then may perform cycling for 20 minutes. Here, the electronic device 100 may divide an entire activity of the user into three divided activity states. For example, the electronic device 100 may classify the period of 13 minutes as a first time range, may classify the period of 15 minutes as a second time range, and may classify the period of 20 minutes as a third time range. The electronic device 100 may collect activity states of each unit time with respect to each time range, and may determine a representative activity state based on collected activity states.

If pieces of sensor information of the first time range collected in response to user's walking are analyzed for each unit time, the electronic device 100 may collect at least one of unit times corresponding to a walking activity state, unit times corresponding to a running activity state, or unit times corresponding to a stationary state. Here, the electronic device 100 may determine an activity state (e.g., a walking activity state) having a relatively high frequency among activity states of the first time range as a representative activity state of the corresponding time range. Furthermore, the electronic device 100 may exclude (e.g., ignore) unit times of a running activity state or a stationary state included in the first time range.

If pieces of sensor information of the second time range collected in response to user's running are analyzed for each unit time, the electronic device 100 may collect at least one of unit times corresponding to a running activity state, unit times corresponding to a walking activity state, or unit times corresponding to a stationary state. Here, the electronic device 100 may determine an activity state (e.g., a running activity state) having a relatively high frequency among activity states of the second time range as a representative activity state of the corresponding time range. A walking activity state or a stationary state having a relatively low frequency may be ignored. Accordingly, even if information for another activity state is collected during the second time range, the electronic device 100 may determine a running activity state as a representative activity state of the second time range.

In the case where entire sensor information according to a user's activity is received, the electronic device 100 may divide the above-mentioned first to third time ranges according to general sensor information characteristics exhibited in each time range. For example, the electronic device 100 may determine a boundary between the first time range and the second time range based on the fact that a last part of the first time range differs in sensor information characteristics from a beginning part of the second time range. Likewise, the electronic device 100 may determine a time range boundary based on a sensor information characteristics difference between a last part of the second time range and a beginning part of the third time range.

In the case where the user performs a walking exercise for at least a specified time (e.g., 10 minutes), the electronic device 100 may determine the corresponding time range as the first time range, and may accumulatively store the first time range. If a sensor information characteristic (e.g., a characteristic corresponding to a running activity state) which differs by at least a specified value from a sensor information characteristic (e.g., a characteristic corresponding to a walking activity state) in the first time range occurs, the electronic device 100 may differentiate an end point of the first time range from a start point of the second time point so as to determine a boundary between the first time range and the second time range. In this operation, if the sensor information characteristic which differs by as much as the specified value is maintained for at least a specified time (e.g., at least 1 minute, 3 minutes, or 10 minutes), the electronic device 100 may determine that an activity state is changed. In the case where the sensor information characteristic is changed for less than the specified time, the electronic device 100 may determine that an activity state is temporarily changed.

Figure 5A:
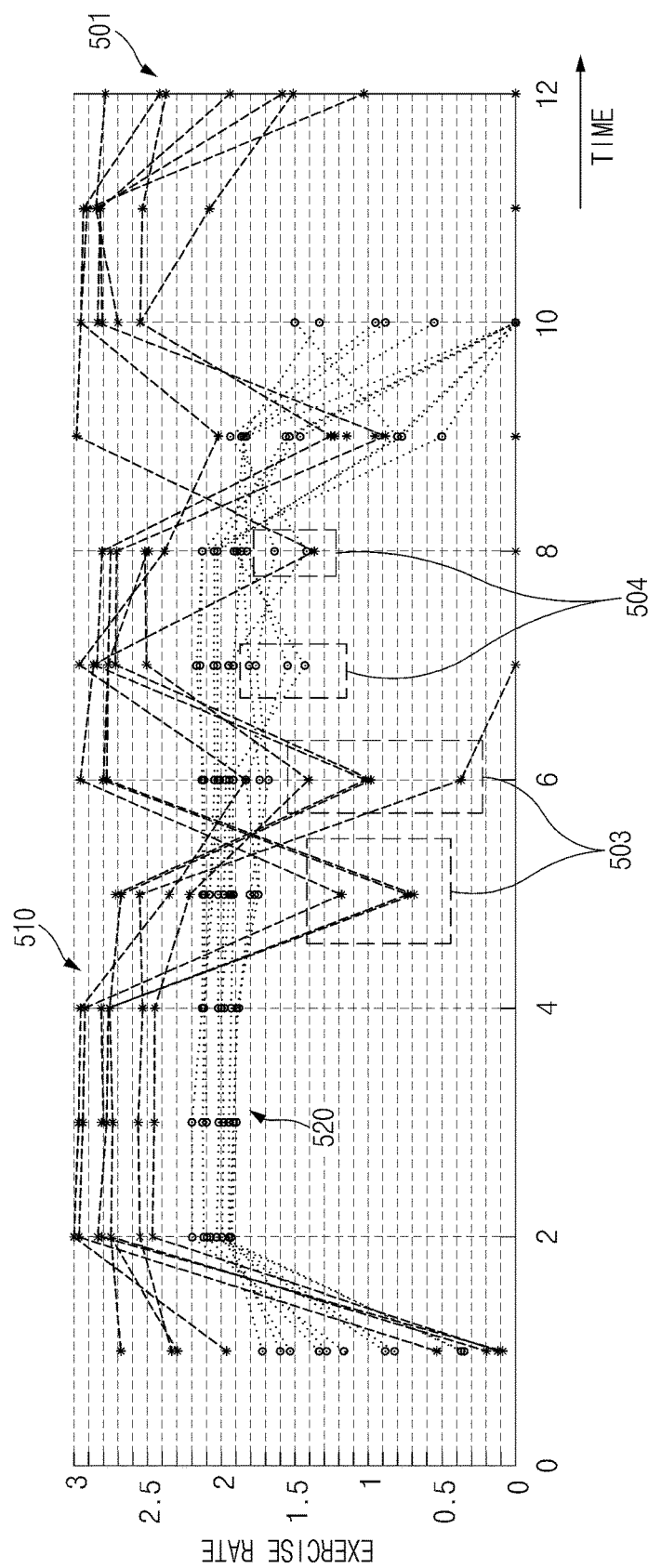
FIG. 5A is a graph illustrating division of activity states of sensor information according to an embodiment of the present disclosure.

FIG. 5A is a graph illustrating division of activity states of sensor information according to an embodiment of the present disclosure. In the graph, the X-axis may be a time axis. The Y-axis of the graph may represent exercise rate information obtained based on an acceleration sensor. The electronic device 100 may collect first sensor information 510 corresponding to a running activity state and second sensor information 520 corresponding to a walking activity state. The first sensor information 510 may include a period in which the first sensor information 510 is higher than a state change boundary value 501 (approximately 2.4 in the graph) and a period 503 in which the first sensor information 510 is lower than the state change boundary value 501. Accordingly, if the first sensor information 510 is divided by a unit time, the electronic device 100 may collect information corresponding to unit times corresponding to running activity states in the period in which the sensor information 510 is higher than the state change boundary value 501 and information corresponding to unit times corresponding to an activity state (e.g., a walking activity state or stationary state) other than a running activity state in the period 503 in which the sensor information 510 is lower than the state change boundary value 501. As an amount of the information of the period in which the first sensor information 510 is higher than the state change boundary value 501 is relatively large, the electronic device 100 may determine a running activity state as a representative activity state of collected sensor information. In other words, short burst of secondary activity are subsequently ignored in a display of representative information for the overall time period.

As shown in FIG. 5A, since the second sensor information 520 is lower than the state change boundary value 501, the electronic device 100 may determine the second sensor information 520 as sensor information corresponding to a walking activity state. As shown in FIG. 5A, the second sensor information 520 may include values equal to or higher than a certain rate and values (e.g., 504) lower than the certain rate. The values 504 lower than the certain rate, for example, may include sensor information corresponding to an activity state different from that of the values equal to or higher than the certain rate, such as a stationary state or a slow walking state. The electronic device 100 may perform activity state division for each unit time with respect to the second sensor information 520, and may determine an activity state (e.g., a walking activity state) having a relatively high occurrence as a representative activity state.

In various embodiments, the state change boundary value may be adjusted according to user information. For example, the state change boundary value may be changed to be higher or lower than the illustrated rate values (e.g., 2.4 Hz) according to age, gender, exercise history, a life pattern, the number of normal steps per unit time, or a normal step width of a specific user. To this end, the electronic device 100 may provide a user interface (or a screen interface) for selecting an activity information processing time. For example, the electronic device 100 may output, to the display 160, an item for selecting an activity information processing time such as from 10 a.m. to 2 or 4 p.m. or from 6 a.m. to 6 p.m. The electronic device 100 may collect sensor information for a selected time, and may collect and output activity state changes based on collected sensor information. The electronic device 100 may detect the number of data points equal to or lower than a specified state change boundary value and the number of data points lower than the specified state change boundary value among pieces of provided sensor information, and may determine an activity state corresponding to a larger number of data points as a representative activity state.

Figure 5B:
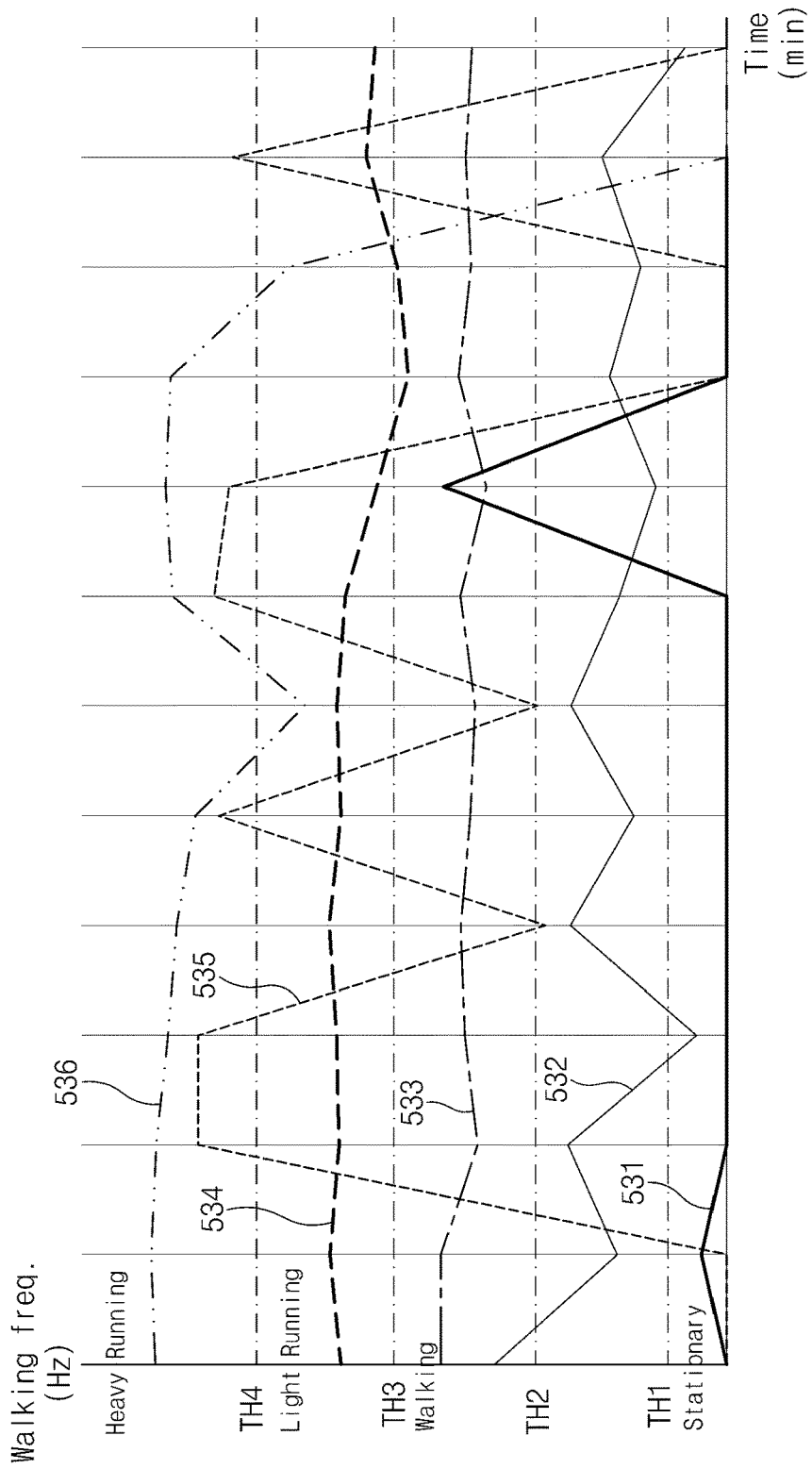
FIG. 5B is a graph illustrating another example of division of activity states of sensor information according to an embodiment of the present disclosure.

FIG. 5B is a graph illustrating another example of division of activity states of sensor information according to an embodiment of the present disclosure. As shown in FIG. 5B, sensor information may be displayed as a certain data flow between a time axis and a frequency (e.g., the number of steps per unit time) axis. The sensor information may differentiate the types of activity states based on one or more state change boundary values TH1 to TH4 with respect to a certain time. For example, even if the electronic device 100 displays a representative activity state, the electronic device 100 may determine the type of a specific representative detailed item (e.g., an exercise type) according to a sensor information pattern (e.g., whether a period of steps is constant, the width of a step, the number of steps per unit time, etc.). According to an embodiment of the present disclosure, the electronic device 100 may specify a running activity state as jogging or marathon based on the state change boundary value TH4. For example, if sensor information 536, which is generally or on average equal to or higher than the state change boundary value TH4 and has a certain flow, is obtained, the electronic device 100 may determine the sensor information 536 as a representative detailed item corresponding to marathon (or running training, hard exercise, etc.)

According to various embodiments of the present disclosure, if sensor information 535, which fluctuates between the state change boundary values TH1 to TH4 and exhibits an irregular flow, is obtained, the electronic device 100 may determine the sensor information 535 as a representative detailed item corresponding to a specific sport such as football, tennis, table tennis, or basketball. According to various embodiments of the present disclosure, if sensor information 534, which is generally or on average between the state change boundary values TH3 and TH4 and exhibits a certain flow, is obtained, the electronic device 100 may determine the sensor information 534 as a representative detailed item corresponding to light running such as jogging. According to various embodiments of the present disclosure, if sensor information 533, which is generally or on average between the state change boundary values TH3 and TH2 and exhibits a certain flow, is obtained, the electronic device 100 may determine the sensor information 533 as a representative detailed item corresponding to hard walking such as race walking or tracking. According to various embodiments of the present disclosure, if sensor information 532, which is generally or on average between the state change boundary values TH2 and TH1 and exhibits an irregular flow, is obtained, the electronic device 100 may determine the sensor information 532 as a representative detailed item corresponding to light walking such as a stroll. According to various embodiments of the present disclosure, if sensor information 531, which exhibits an information (or data) flow that is generally or on average lower than TH1, is obtained, the electronic device 100 may determine the sensor information 531 as a representative detailed item corresponding to a rest, non-activity, or a stationary state. As described above, the electronic device 100 may output information corresponding to a representative detailed item for a representative activity state in consideration of regularity (duration) of a step period, dispersion (deviation) of a step period, temporal activity dispersion, etc.

As described above, the electronic device 100 may divide detailed items of an activity state. For example, the electronic device 100 may divide detailed items (e.g., fast walking (race walking), slow walking, hiking, strolling, etc.) for a walking activity state. According to various embodiments of the present disclosure, the electronic device 100 may determine one of detailed items as a representative activity state based on state change boundary values, and may output information (e.g., at least one of a text or an image) corresponding to the representative activity state. For example, if a walking activity state is determined as a representative activity state for sensor information obtained in a specified time range, the electronic device 100 may re-perform evaluation on detailed items. In the case where distribution of pieces of sensor information corresponding to a first detailed item (e.g., race walking) is relatively high as a result of re-performance, the electronic device 100 may determine the first detailed item as a representative detailed item. During a process of outputting a representative activity state value, the electronic device 100 may output display information corresponding to the representative detailed item in substitution for a representative activity state. Alternatively, the electronic device 100 may output the representative activity state value as display information corresponding to a walking activity state, and may output the display information corresponding to the representative detailed item in response to an input event (e.g., an input event for selecting display information corresponding to a walking activity state or viewing detailed information).

The above-mentioned state change boundary values may be differently adjusted for each user information, or may adjusted according to a user input. In relation to this operation, the electronic device 100 may provide a screen interface for adjusting the state change boundary values. According to an embodiment of the present disclosure, if specific sensor information is collected, an item for setting the state change boundary values and a graph for the collected sensor information may be provided. The user may touch and move a state change boundary value to a certain position, so as to adjust the state change boundary value for an exercise type conceived by the user (e.g., a state change boundary value for fast walking for each user, a state change boundary value for jogging for each user, etc.).

According to the above-mentioned various embodiments of the present disclosure, an electronic device may include a housing (e.g., a case surrounding at least a part of at least one of the above-mentioned processor, memory, bus, input/output interface, communication interface, display, or sensor), a sensor included in the housing and configured to sense a movement of the electronic device, a processor electrically connected to the sensor, and a memory electrically connected to the processor, wherein the memory may store instructions that, when executed, cause the processor to receive, from the sensor during a first period of time, at least one first sensing data (e.g., sensor information) indicating occurrence of a first activity (e.g., a stationary activity, a walking activity, a running activity, operating a cycle, using a vehicle, etc.) of a user of the electronic device, receive, from the sensor during a second period of time, at least one second sensing data indicating occurrence of a second activity (e.g., an activity different from the first activity) of the user of the electronic device, and output information indicating that the first activity has occurred instead of the second activity during the second period of time at least partially based on the first sensing data and the second sensing data.

According to various embodiments of the present disclosure, the instructions may cause the processor to output information indicating that the first activity has occurred during a period of time including the first period of time and the second period of time at least partially based on the first sensing data and the second sensing data.

According to various embodiments of the present disclosure, the electronic device may further include a display electrically connected to the processor, and the instructions may cause the processor to display, on the display, a user interface for displaying an activity of the user, and display, on the user interface, occurrence of the first activity during the second period of time based on the information.

According to various embodiments of the present disclosure, the user interface may display an item including a line, a band, or a curve extending according to a time, and the instructions may cause the processor to display occurrence of the first activity during the first period of time and the second period of time displayed on the item.

According to various embodiments of the present disclosure, the first sensing data may be equal to or larger than a first threshold value, and the second sensing data may be equal to or smaller than the first threshold value.

According to various embodiments of the present disclosure, the first threshold value may be variable at least partially based on information of the user.

According to various embodiments of the present disclosure, the instructions may cause the processor to receive, from the sensor, a plurality of sensing data during a selected period of time, determine a first number indicating a number of data having a value equal to or larger than the first threshold value and a second number indicating a number of data having a value equal to or smaller than the first threshold value among the plurality of sensing data, and select one of the first activity and the second activity as a representative activity during the selected period of time at least partially based on the determination.

According to various embodiments of the present disclosure, the instructions may cause the processor to compare the first number with the second number, and select one of the first activity and the second activity as the representative activity during the selected period of time at least partially based on a result of the comparison.

According to various embodiments of the present disclosure, the first activity may include a running activity of the user, and the second activity may include a walking activity of the user.

According to the above-mentioned various embodiments of the present disclosure, an electronic device according to an embodiment of the present disclosure may include a housing, a sensor included in the housing and configured to sense a movement of the electronic device, a processor electrically connected to the sensor, and a memory electrically connected to the processor, wherein the memory may store instructions that, when executed, cause the processor to divide, when sensor information corresponding to occurrence of an activity having a specified magnitude or more is collected during a specified time range, the collected sensor information by a specified unit time, differentiate the types of activity states of the specified unit times, determine a specific activity state as a representative activity state of the specified time range based on distribution of the activity states of the specified unit times, and output information corresponding to a determined representative activity state.

According to various embodiments of the present disclosure, the instructions may cause the processor to output the time range, the representative activity state of which has been determined, as a certain object or a certain section on a reference time.

According to various embodiments of the present disclosure, the instructions may cause the processor to output a section associated with a plurality of representative activity states, and alternately output pieces of information corresponding to the plurality of representative activity states when the section is selected.

According to various embodiments of the present disclosure, the instructions may cause the processor to output a section associated with a plurality of representative activity states, and output representative detailed items of the plurality of representative activity states or detailed information for the plurality of representative activity states when the section associated with the plurality of representative activity states is selected.

According to various embodiments of the present disclosure, the instructions may cause the processor to determine, when an input event for viewing the detailed information of the representative activity state is received, a representative detailed item corresponding to one type of the representative activity state according to a pattern of sensor information corresponding to the representative activity state, and output information corresponding to the representative detailed item.

According to various embodiments of the present disclosure, the instructions may cause the processor to output a time range corresponding to the plurality of representative activity states as one integrated activity state.

According to various embodiments of the present disclosure, the instructions may cause the processor to display, when a specific section is selected from among certain sections, at least one of an activity state type, an activity state duration time, or an activity state start time related to the selected section.

According to various embodiments of the present disclosure, the instructions may cause the processor to output activity state history information for a reference time if the representative activity state continues for a specified first time.

According to various embodiments of the present disclosure, the instructions may cause the processor to display the activity state history information for each specific time zone.

According to the above-mentioned various embodiments of the present disclosure, an electronic device may include a housing, a sensor included in the housing and configured to sense a movement of the electronic device, a processor electrically connected to the sensor, and a memory electrically connected to the processor, wherein the memory may store instructions that, when executed, cause the processor to collect, as session information, sensor information collected by the sensor according to a specified period or a time point of occurrence of a specified event, and treat the obtained session information as a new session or integrate the obtained session information with a previous session according to activity state homogeneity of the obtained session information with previously stored session information and at least one of a time length of the obtained session information or a time length of the previously stored session information.

According to various embodiments of the present disclosure, the instructions may cause the processor to determine an activity state of a session having a relatively long time as a representative activity state of an integrated session when performing integration of session.

Figure 6:
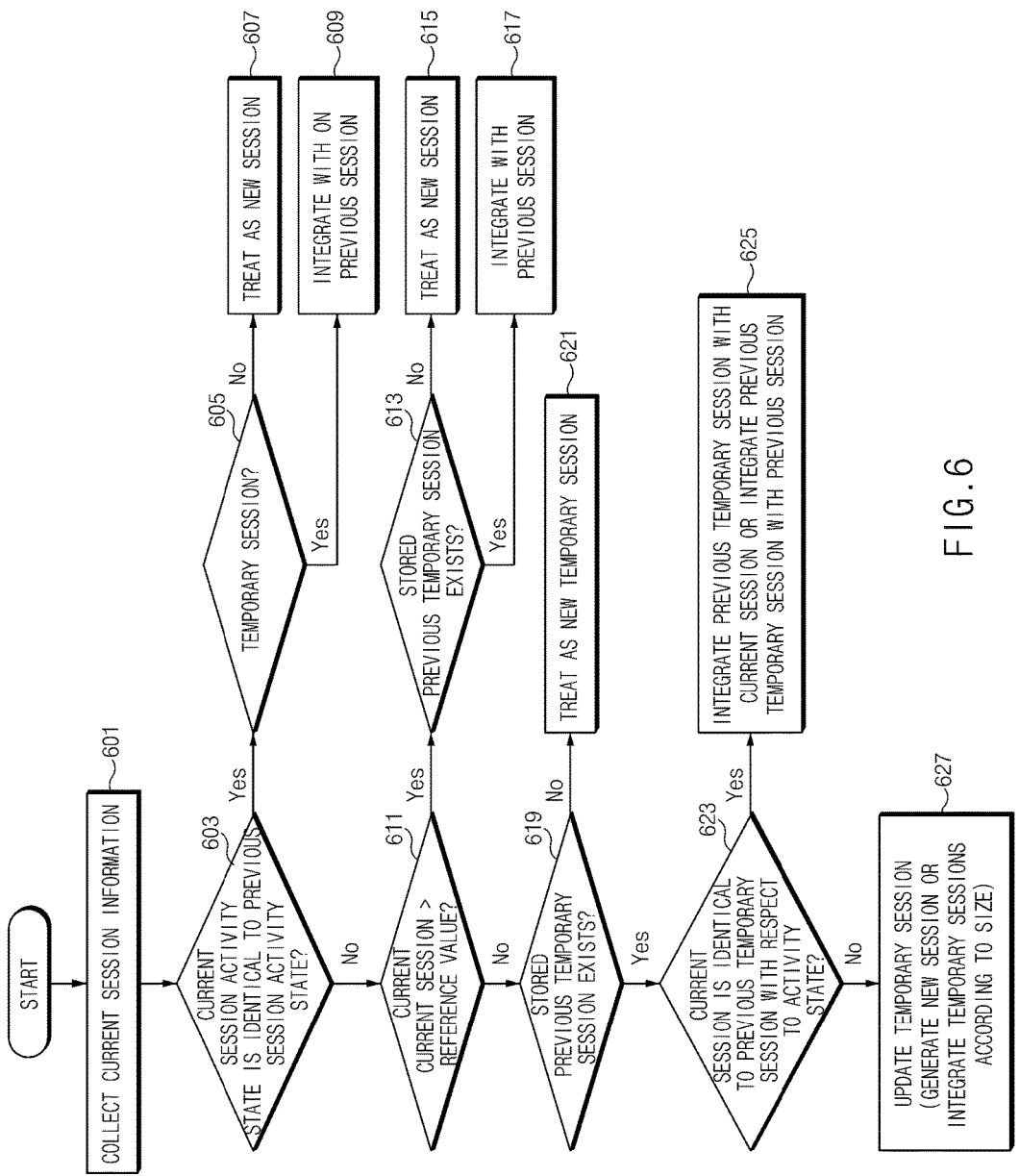
FIG. 6 is a diagram illustrating an example of a session processing method according to an embodiment of the present disclosure.

FIG. 6 is a diagram illustrating an example of a session processing method according to an embodiment of the present disclosure. In operation 601, the electronic device 100 (e.g., the activity information processing module 123) may collect current session information in response to occurrence of an event. Device 100 may collect, as session information, sensor information collected at a specified period. For example, the electronic device 100 may collect sensor information at a specified period (e.g., 10 minutes or 20 minutes) by operating the sensor hub 180 while the processor 120 is in an idle period. If an event of waking up the processor 120 (e.g., at least one of an event related to turning on the display 160, an external input event, or an application request event) occurs, the electronic device 100 may collect, as current session information, sensor information collected prior to the occurrence of the event.

In operation 603, the electronic device 100 (e.g., the activity information processing module 123) may determine whether a current session activity state is identical to a previous session activity state. If the current session activity state is identical to the previous session activity state, the electronic device 100 may determine whether a current session is a temporary session in operation 605. For example, the electronic device 100 may determine whether a time range of the current session is equal to or shorter than a specified length (e.g., 20 seconds, 30 seconds, or 1 minute). If the time range of the current session is equal to or shorter than the specified length, the electronic device 100 may determine the current session as a temporary session.

If the current session is not a temporary session (e.g., in the case where the time range of the current session is longer than the specified length), the electronic device 100 may treat the collected current session as a new session in operation 607. For example, the electronic device 100 may register the current session as a new session item in a session list related to session management.

If the current session is a temporary session (e.g., in the case where the time range of the current session is shorter than the specified length), the electronic device 100 may integrate the current session with a previous session in operation 609. For example, if the previous session corresponds to a walking activity state, and walking was performed for a certain time (e.g., 10 minutes) in the previous session, the electronic device 100 may add the time range (e.g., 17 seconds) of the current session to the time range of the previous session (e.g., 10 minutes and 17 seconds).

If the current session activity state is not identical to the previous session activity state, the electronic device 100 (e.g., the activity information processing module 123) may determine whether the current session is larger than a reference value in operation 611. The reference value, for example, may include the certain time range for distinguishing the temporary session described above with respect to operation 605. According to various embodiments of the present disclosure, the reference value may be different from the certain time range for distinguishing the temporary session.

If the current session is larger than the reference value, the electronic device 100 may check whether a stored previous temporary session exists in operation 613. If the previous temporary session does not exist, the electronic device 100 may treat the current session as a new session in operation 615. For example, the electronic device 100 may register the current session as a new session item in the session list. After the new session item is registered, the process may return to operation 601 so that the electronic device 100 may collect session information according to a certain period or occurrence of an event. If the stored previous temporary session exists, the electronic device 100 may integrate the current session with the previous session in operation 617. For example, if the previous temporary session (e.g., time range of 10 seconds) exists, the electronic device 100 may integrate the current session (e.g., time range of 1 minute) with the previous temporary session so as to generate an integrated session (e.g., time range of 1 minute and 10 seconds). The electronic device 100 may register the new integrated session in the session list, and the process may return to operation 601 so that the electronic device 100 may re-perform operation 601 and the following operations.

If the current session is smaller than the reference value, the electronic device 100 may check whether a stored previous temporary session exists in operation 619. If the stored previous temporary session does not exist, the electronic device 100 may treat the current session as a new session in operation 621. For example, the electronic device 100 may register the current session which is smaller than the reference value as a new temporary session in the session list.

If the stored previous temporary session exists, the electronic device 100 (e.g., the activity information processing module 123) may determine whether an activity state of the current session is identical to that of the stored previous temporary session in operation 623. If the activity state of the current session is identical to that of the stored previous temporary session, the electronic device 100 may integrate the current session with the previous temporary session in operation 625.

If the activity state of the current session is different from that of the stored previous temporary session, the electronic device 100 (e.g., the activity information processing module 123) may perform temporary session updating in operation 627. For example, according to a size of a temporary session, the electronic device 100 may generate a new session or may integrate temporary sessions. According to an embodiment of the present disclosure, if a session larger than the reference value is generated by integrating the time ranges of the previous temporary session and the current session smaller than the reference value, the electronic device 100 may generate a new session. Here, the electronic device 100 may determine an activity state of a relatively long time range among integrated sessions as an activity state of the corresponding session. For example, if the previous temporary session corresponds to a 19-second walking activity state, the current session corresponds to a 5-second running activity state, and the reference value is 20 seconds, the electronic device 100 may generate a new session of a 24-second walking activity state. According to various embodiments of the present disclosure, if the previous temporary session corresponds to a 4-second walking activity state, the current session corresponds to a 15-second running activity state, and the reference value is 20 seconds, the electronic device 100 may generate an integrated temporary session of a 19-second walking activity state.

According to various embodiments of the present disclosure, when sensor information corresponding to a certain time range (e.g., 20 minutes) is received, the electronic device 100 may perform session division according to an activity state change by analyzing pieces of sensor information included in the time range. In this operation, the electronic device 100 may divide sessions according to a characteristic change (e.g., a change from a stationary state to a walking state, or a change from a walking state to a running state) of the sensor information, and may handle a recently collected session in the above-mentioned manner. For example, the electronic device 100 may receive sensor information corresponding to a 41-second walking activity state after a 19-minute walking activity state and a 19-second running activity state during a certain time range. In this case, the electronic device 100 may receive the sensor information corresponding to the 41-second walking activity state as a current session in the state where the 19-minute walking activity state is classified as a previous session and the 19-second running activity state is stored as a previously stored temporary session. With respect to pieces of received session information, the electronic device 100 may integrate the previously stored temporary session corresponding to the 19-second running activity state with the current session to thereby generate a session corresponding to a 1-minute walking activity state (e.g., since the walking activity state has a longer length of 41 seconds, the previously stored temporary session is integrated into a session corresponding to the walking activity state).

According to the above-mentioned various embodiments of the present disclosure, an activity information processing method according to an embodiment of the present disclosure may include receiving, from a sensor during a first period of time, at least one first sensing data indicating occurrence of a first activity of a user of an electronic device, receiving, from the sensor during a second period of time, at least one second sensing data indicating occurrence of a second activity of the user of the electronic device, and outputting information indicating that the first activity has occurred instead of the second activity during the second period of time at least partially based on the first sensing data and the second sensing data.

According to various embodiments of the present disclosure, the outputting may include outputting information indicating that the first activity has occurred during a period of time including the first period of time and the second period of time at least partially based on the first sensing data and the second sensing data.

According to various embodiments of the present disclosure, the method may further include displaying, on a display, a user interface for displaying an activity of the user and displaying, on the user interface, occurrence of the first activity during the second period of time based on the information.

According to various embodiments of the present disclosure, the displaying may include displaying an item including a line, a band, or a curve extending according to a time and displaying occurrence of the first activity during the first period of time and the second period of time displayed on the item.

According to various embodiments of the present disclosure, the method may further include classifying sensor information received from the sensor as the first sensing data if the sensing data is equal to or larger than a specified threshold value and classifying the sensor information received from the sensor as the second sensing data if the sensing data is smaller than the threshold value.

According to various embodiments of the present disclosure, the method may further include changing the specified threshold value at least partially based on information of the user.

According to various embodiments of the present disclosure, the method may further include receiving, from the sensor, a plurality of sensing data during a selected period of time, determining a first number indicating a number of data having a value equal to or larger than the first threshold value and a second number indicating a number of data having a value equal to or smaller than the first threshold value among the plurality of sensing data, and selecting one of the first activity and the second activity as a representative activity during the selected period of time at least partially based on the determination.

According to various embodiments of the present disclosure, the selecting may include comparing the first number with the second number and selecting one of the first activity and the second activity as the representative activity during the selected period of time at least partially based on a result of the comparison.

Figure 7:
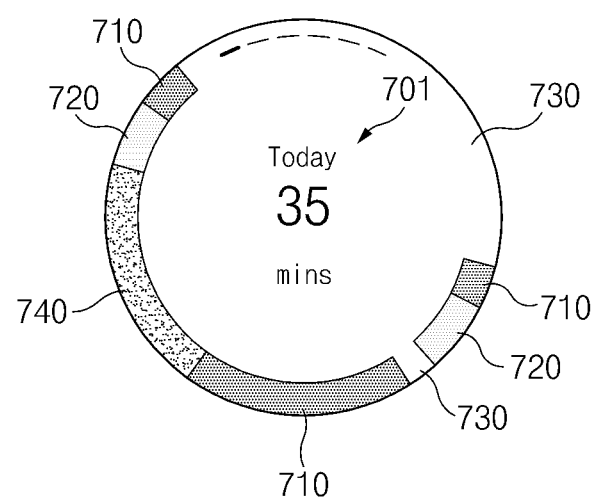
FIG. 7 is a diagram illustrating an example of a screen interface related to activity information displaying according to an embodiment of the present disclosure.

FIG. 7 is a diagram illustrating an example of a screen interface related to activity information displaying according to an embodiment of the present disclosure.

In various embodiments, an electronic device may output, for example, a user interface for displaying an item including a line, a band, or a curve extending as a representation of time. For example, the electronic device (e.g., at least one of the first electronic device 100a or the second electronic device 100b) may output a user interface, at least a part of which is curved or circular as shown in FIG. 7. The circular user interface, for example, may include activity state objects 710, 720, 730, and 740 and activity state display information 701.

The circular user interface, for example, may correspond to a certain time (e.g., 24 hours, one week, one month, etc.). As an example, a circular rim may be recognized as indicating 24 hours. At least one activity state object may be arranged along the circumference of the circular rim. In an example, activity state objects may include a normal activity state object 710, an exercise activity state object 720, a stationary state object 740, and a non-worn state object 730.

The normal activity state object 710, for example, may be an object indicating a time range in which a continuous movement occurs for less than a specified time (e.g., 10 minutes). A "normal activity" may be considered an activity other than a planned exercise activity, since a planned exercise activity typically involves continuous movement for at least a specified time. For example, in the case where the user performs an activity having a value equal to or larger than a specified magnitude (e.g., walking, running, cycling, or the like) intermittently for less than 10 minutes-, the normal activity state object 710 may be displayed so as to correspond approximately to a duration of the normal activity. In the case where the user continuously performs the activity having a value equal to or larger than the specified magnitude for at least 10 minutes, the exercise activity state object 720 may be accordingly displayed. The activity having a value equal to or larger than the specified magnitude may be determined based on whether pieces of sensor information collected by the sensor 140 include sensor information corresponding to an activity having a value equal to or larger than a certain magnitude. For example, if sensor information corresponding to walking, running, cycling, or the like is collected, the electronic device 100 may determine the activity having a value equal to or larger than the specified magnitude. According to various embodiments of the present disclosure, at least one of a color or a shape of the exercise activity state object 720 may be changed according to the type of an exercise. For example, in the case where only walking is performed for a time corresponding to the exercise activity state object 720, the electronic device 100 may output an object of a first shape. In the case where only running is performed for the time corresponding to the exercise activity state object 720, the electronic device 100 may output an object of a second shape different from the first shape. In the case where running and walking are performed for the time corresponding to the exercise activity state object 720, the electronic device 100 may output an object of a third shape. The third shape, for example, may be a shape including the first shape and the second shape or may be a shape obtained by mixing the first shape and the second shape according to a specified condition. According to various embodiments of the present disclosure, the electronic device 100 may differentially display the first shape and the second shape of the exercise activity state object 720 according to a running ratio and a walking ratio. The activity states such as walking, running, etc. may correspond to the above-mentioned representative activity state.

The stationary state activity 740 may be displayed in response to collection of sensor information corresponding to an activity having a value equal to or smaller than a specified magnitude or if there is no user activity. For example, when sensor information corresponding to the case where the user sits on a chair or lies on a specific location is collected, the electronic device 100 may output the stationary state object 740 according to a corresponding time. The non-worn state object 730 may be output in response to a state in which the electronic device 100 is not worn.

The activity state display information 701, for example, may display a time range in which an activity having a value equal to or larger than a specified magnitude was performed for a longest time during a specified period of time (e.g., 24 hours). The activity state display information 701 may represent a total accumulated time of exercise activity states during the specified period of time (e.g., 24 hours). The activity state display information 701 may be time information related to a lastly or initially collected exercise activity state.

In various embodiments, the above-mentioned activity state objects may be determined based on a representative activity state for pieces of sensor information obtained within a corresponding time range. For example, sensor information obtained during an exercise activity state time related to the exercise activity state object may include at least a part of sensor information corresponding to at least one of a stationary state, a walking state, a running state, or a cycling state. The electronic device 100 may determine an activity state having a relatively high ratio among the corresponding pieces of sensor information as a representative activity state, and may map the determined state to the exercise activity state object. In an example, even if sensor information corresponding to a stationary state is added during a time corresponding to the normal activity state object, the electronic device 100 may determine a normal activity state as a representative activity state of the corresponding time in the case where a ratio of an exercise activity state is higher than a specified first ratio. Furthermore, even if sensor information corresponding to an exercise activity state is added during a time corresponding to the stationary state object, the electronic device 100 may determine a stationary state as a corresponding representative activity state in the case where a ratio of a stationary state is higher than a specified second ratio.

Figure 8:
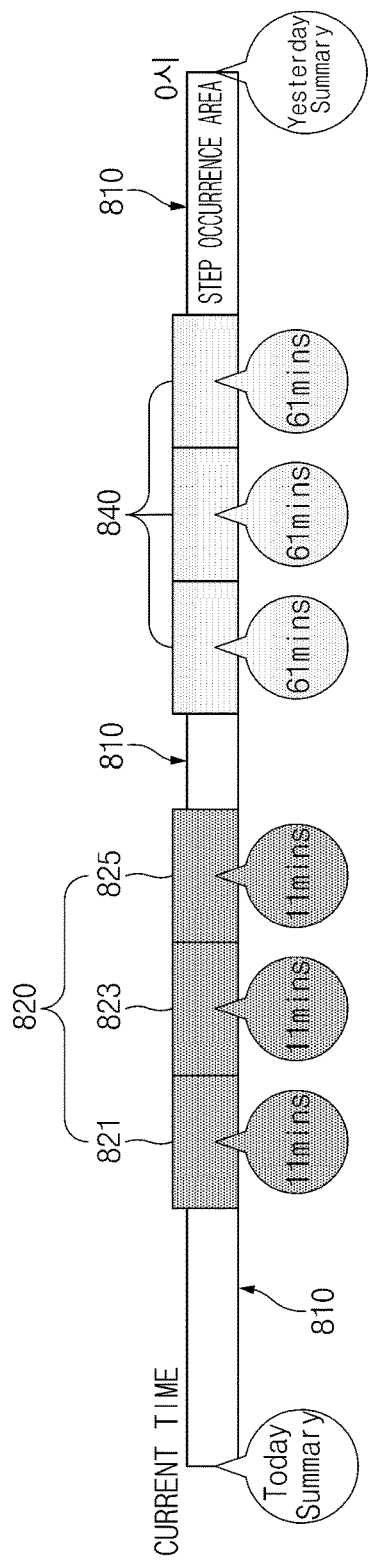
FIG. 8 is a diagram illustrating an activity state change according to an embodiment of the present disclosure.

FIG. 8 is a diagram illustrating an activity state change according to an embodiment of the present disclosure. In this example, the electronic device 100 may detect an activity state change based on pieces of sensor information collected during a specified period of time (e.g., 24 hours), and may display a result of detection as shown in FIG. 8. Here, electronic device 100 may output one integrated activity state (e.g., an exercise activity state, a normal activity state, or the like) according to at least one representative activity state (e.g., at least one of a walking activity state, a running activity state, or a cycling activity state). For example, the electronic device 100 may display a normal activity state object 810, an exercise activity state object 820, and a stationary state object 840 based on sensor information accumulated for each day. As illustrated, if sensor information corresponding to a normal activity state is received for a certain time since a specified start time (e.g., 0 hour), the electronic device 100 may output the normal activity state object 810. If a stationary state is maintained (e.g., for 3 hours and 3 minutes) after the normal activity state, the electronic device 100 may output the stationary state object 840. The electronic device 100 may display the exercise activity state object 820 at a section corresponding to an exercise state. In this operation, the electronic device 100 may output activity states of the exercise state (e.g., a walking activity state object 821, a running activity state object 823, and a cycle operating state object 825) as the exercise activity state object 820.

According to various embodiments of the present disclosure, if an activity state occurring over a relatively long time period is detected from activity states, the electronic device 100 may display the activity state as a representative activity state on a display area of the exercise activity state object 820. For example, in the case where a walking activity state occurs for 30 minutes, a running activity state occurs for 1 minute, and a cycle operating state occurs 1 minute, the electronic device 100 may display the exercise activity state object 820 so that it corresponds to the walking activity state. A predetermined time duration threshold may be used to determine whether an activity is a secondary activity (as in the 1 minute of running or cycling just mentioned), or is of a sufficient duration of time to be considered a primary activity, i.e., determined to be a "representative activity state" for that duration of time. As one example, an activity state may be considered as an activity state to be ignored in a subsequent exercise activity report (e.g., displayed as in FIG. 8) if it only lasts a time duration which is approximately an order of magnitude less than a specific threshold used for a planned exercise activity.

According to various embodiments of the present disclosure, each integrated information (e.g., integrated activity state information of today (or yesterday), representative activity state information of today (or yesterday), or the like) may be output to a graphic summary like the band of FIG. 8. The electronic device 100 may display objects with different colors so that activity state changes may be intuitively recognized.

Figure 9A:
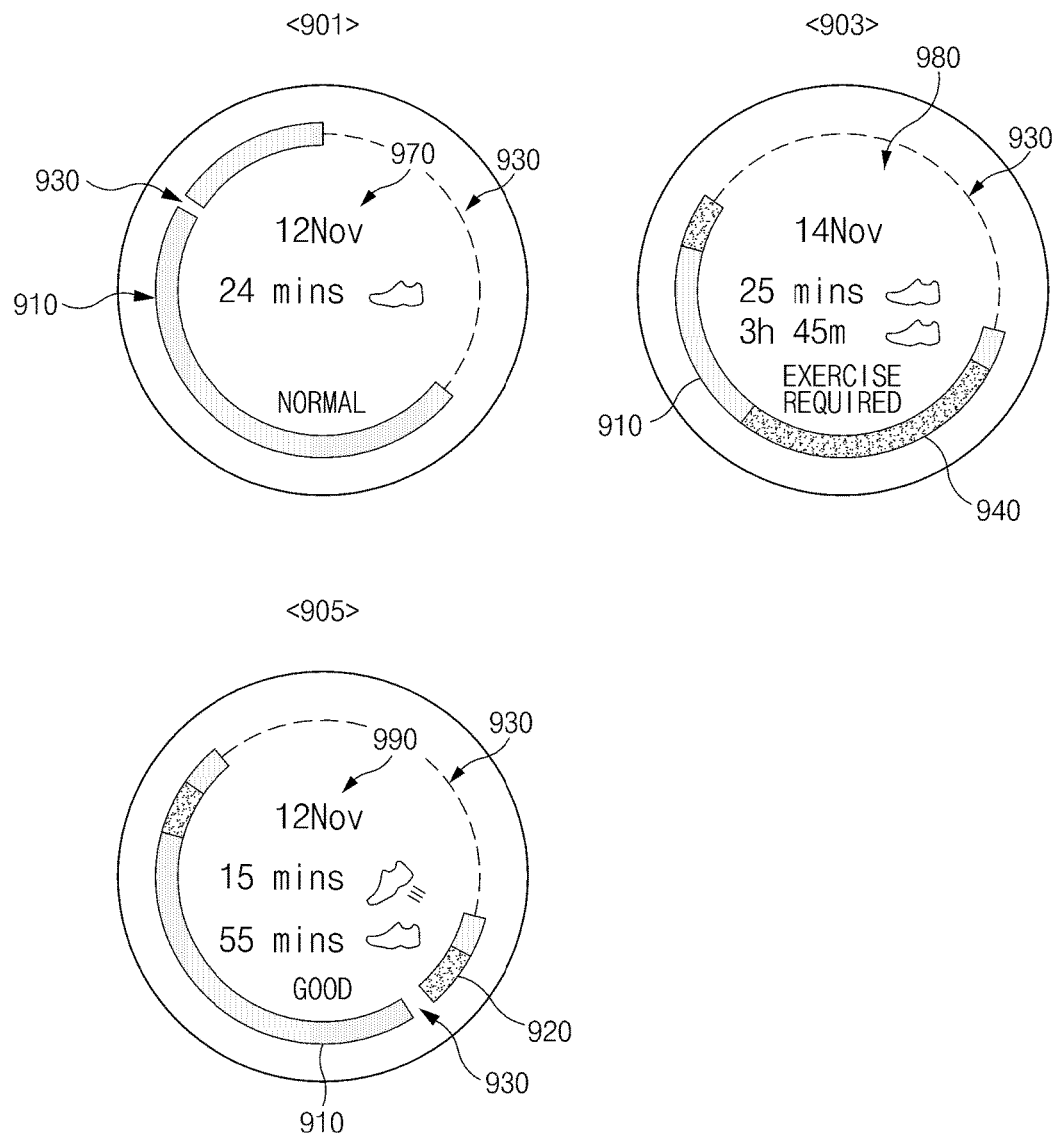
FIG. 9A is a diagram illustrating an example of a screen interface related to various activity states according to an embodiment of the present disclosure.

FIG. 9A is a diagram illustrating an example of a screen interface related to various activity states according to an embodiment of the present disclosure. In the case where the user does not perform an exercise (e.g., walking, running, cycling, or the like) but repeatedly performs a movement having a value equal to or larger than a certain magnitude, the electronic device 100 may output a user interface mostly formed of a normal activity state object 910 as shown in a state 901. In this case, the electronic device 100 may output, to first activity state display information 970, a specified guide message, for example, "normal", as activity state history information. A non-worn state object 930 may be displayed in the case where the electronic device 100 is not worn (e.g., in the case where a sensor or a switch of a wearable electronic device outputs (or generates) sensor information indicating a non-worn state).

In various embodiments, the electronic device 100 may perform information processing for an activity state change based on sensor information (e.g., sensor information obtained from 6 a.m. to a current time) accumulated at a specified time, for example, a specific time set by the user or set in the electronic device 100, such as 12 p.m. or 9 p.m. For instance, if an event of requesting viewing an activity state change occurs, the electronic device 100 may perform information processing for an activity state change based on sensor information obtained from a specified time (e.g., 6 a.m.) to a current time, and may output a result of the information processing.

In various embodiments, the electronic device 100 may output the non-worn state object 930 corresponding to a non-worn state, the normal activity state object 910, and a stationary state object 940 as shown in a state 903. In the case where a size of the stationary state object 940 is equal to or larger than a specified size, the electronic device 100 may output second activity state display information 980 including a guide message such as "exercise required" as activity state history information.

In some cases, electronic device 100 may output the non-worn state object 930 corresponding to a non-worn state, the normal activity state object 910, and an exercise activity state object 920 as shown in a state 905. In the case where a size of the exercise state object 920 is equal to or larger than a specified size, the electronic device 100 may display third activity state display information 990 including a guide message such as "good" as activity state history information. Device 100 may additionally display details for each activity state (e.g., HRM, stroll place information, an event, or the like).

Electronic device 100 may differently apply a weight for an activity state. For example, in the case where a weight for a stationary state is set as 1, the electronic device 100 may set a weight for a walking state as 2, may set a weight for a running activity state as 5, and may set a weight for a cycling activity state as 3. Accordingly, even if a running activity state of a relatively short time range is included in a reference time (e.g., one day), the electronic device 100 may determine activity state history information for the reference time as "very good (or hard exercise day, or the like)" by applying a weight.

Even if a walking activity state of a relatively long time range compared to a running time is included in a reference time (e.g., one day), the electronic device 100 may determine activity state history information for the reference time as "good (or exercise day, or the like)" by applying a weight.

Figure 9B:
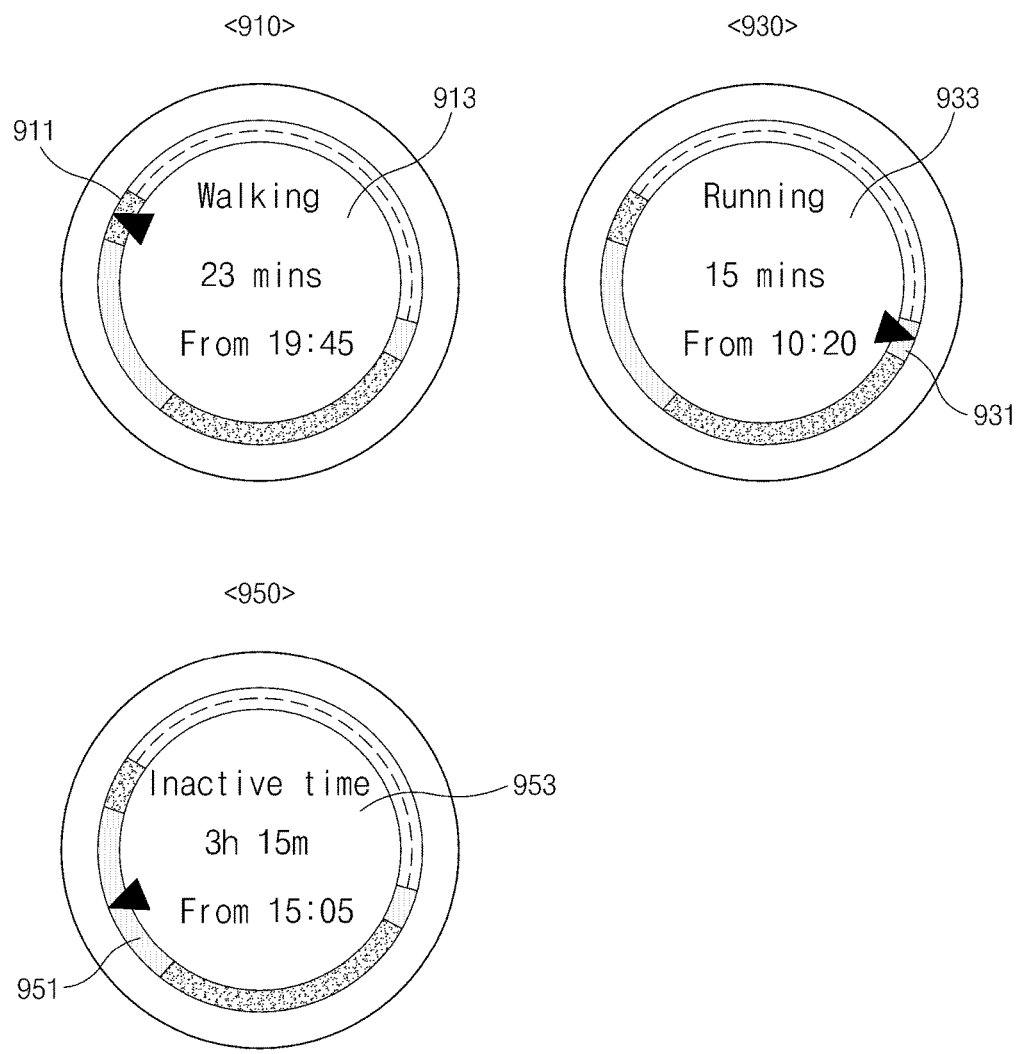
FIG. 9B is a diagram illustrating an example of a screen interface related to various activity states according to an embodiment of the present disclosure.

FIG. 9B is a diagram illustrating an example of a screen interface related to various activity states according to an embodiment of the present disclosure.

In this case, electronic device 100 may output an activity state change using a circular user interface as shown in a state 910. For example, the electronic device 100 may output a circular band including a section corresponding to a normal activity state, a section corresponding to an exercise activity state, and a section corresponding to a stationary state. Device 100 may also output activity state display information. For example, activity state display information 913 may be output according to an indicator (e.g., an arrow or the like) of a section 911 of the circular band which corresponds to an exercise activity state. In this case, the activity state display information 913 may display information corresponding to an exercise activity state related to the section 911. For example, in the case where the user performs walking for 23 minutes in the section 911 corresponding to an exercise activity state, the activity state display information 913 may include walking activity state information ("Walking") and corresponding time information. Furthermore, the activity state display information 913 may include walking activity state start time information (e.g., "From 19:45").

In the case where a specific indicator indicates a section 931, activity state display information 933 may display information related to the section 931 as shown in a state 930. For example, the activity state display information 933 may include information notifying that a running activity state ("Running") has been maintained for a certain time (e.g., 15 minutes) since a start time (10:20) in relation to the section 931. In the states 910 and 930, the indicated sections 911 and 931, for example, may be displayed to correspond to a time at which sensor information corresponding to a movement having a value equal to or larger than a specified magnitude was obtained for at least a first period of time (e.g., 10 minutes).

In the case where a specific indicator indicates a section 951, activity state display information 953 may display information related to the section 951 as shown in a state 950. For example, the activity state display information 953 may include information notifying that a stationary state ("Inactive time") has been maintained for a certain time (e.g., 3 hours and 15 minutes) since a start time (15:05) in relation to the section 951. The section 951 indicated in the state 950, for example, may be displayed to correspond to a time at which sensor information corresponding to a movement having a value equal to or smaller than a specified magnitude was obtained for at least a second period of time (e.g., 1 hour).

An activity state display information area may be set so as to be rotatable or so that an indicator (e.g., an arrow) is rotatable. In the case where the arrow rotates and indicates another section, the activity state display information area may output information related to the other section indicated. In the above-mentioned manner, the electronic device 100 may prevent information equal to or shorter than a specified time (e.g., shorter than 10 minutes) from being displayed, and may display tendencies of pieces of information equal to or longer than a certain time, so that an activity state of a relatively long time range (e.g., one day) may be intuitively understood.

Device 100 may determine and display a representative activity state corresponding to the section 911 in the state 910. For example, the electronic device 100 may display a walking activity state which is a representative activity state with respect to the section 911. In the case where a request for magnifying (or zooming in) the section 911 is received from the user, the electronic device 100 may display at least one activity state corresponding to the section 911. For example, the electronic device 100 may display a user's walking activity state, running activity state, cycling activity state, etc. performed for a time (or session) corresponding to the section 911, in response to the user's request for magnifying.

Figure 9C:
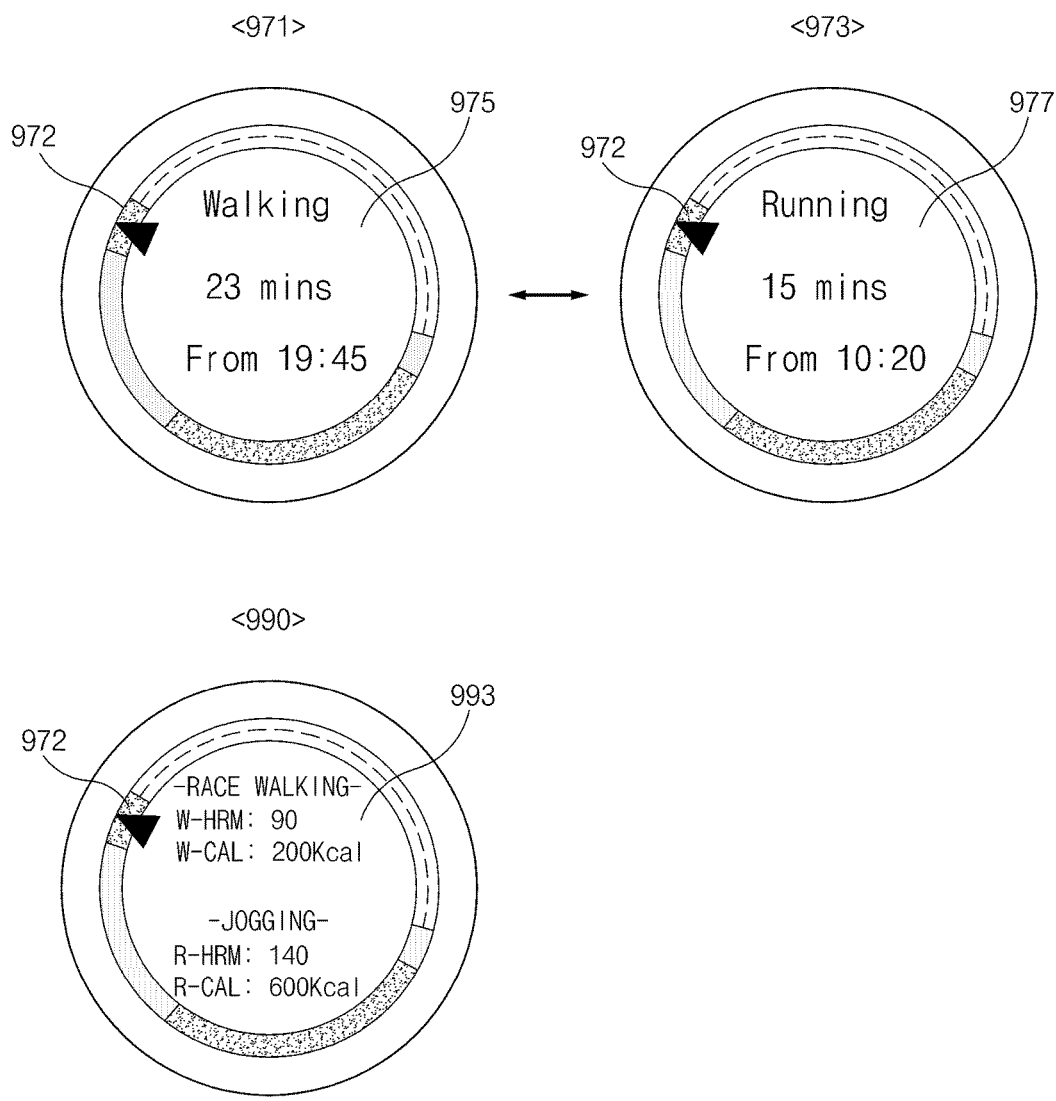
FIG. 9C is a diagram illustrating an example of a screen interface related to output of activity stated display information according to an embodiment of the present disclosure.

FIG. 9C is a diagram illustrating an example of a screen interface related to output of activity stated display information according to an embodiment of the present disclosure. If a certain object or certain section 972 is indicated on a circular (or circular band) user interface, the electronic device 100 may output a representative activity state value corresponding to the section as shown in a state 971. The certain area 972 may be associated with a plurality of representative activity state values. For example, the certain section 972 may correspond to an exercise activity state, and a 23-minute walking activity state and a 15-minute running activity state may be associated as representative activity states with the exercise activity state. In this case, the electronic device 100 may alternately display the state 971 and a state 973 at a certain period (e.g., 1 second, 2 seconds, etc.). For example, in the state 971, the electronic device 100 may output activity state display information 975 for a walking activity state. When a certain time elapses (or in response to a user's touch), the electronic device 100 may output activity state display information 977 for a running activity state to a certain area in the state 973.

If an input event of selecting the activity state display information 975 or 977 is received, the electronic device 100 may output, to a specified area, detailed information or representative detailed item information 933 for an activity state value in response to a depth movement (or a request for moving to a sub menu). The representative detailed item information 933, for example, may include race walking detailed item information for a walking activity state, heart rate monitoring (HRM) information obtained at a time of performing race walking, and calorie information W-CAL consumed due to race walking. Furthermore, the representative detailed item information 933 may include jogging detailed item information for a running activity state, heart rate monitoring (HRM) information obtained at a time of performing jogging, and calorie information R-CAL consumed due to jogging. In the case where one activity state value is associated with the section 972, the electronic device 100 may output detailed information for the activity state value in a state 990. Device 100 may output the graph information described above with reference to FIG. 5A or 5B instead of the representative detailed item information 993. Alternatively, device 100 may output event information (e.g., notification of achievement of a target value by performing walking or running or a reward for the achievement). Device 100 may display detailed sections with respect to the section 972 as described above with reference to FIG. 8, and may output an activity state type value for each detailed section.

FIG. 10 is a diagram illustrating an example of a screen interface related to an activity state history according to an embodiment of the present disclosure. Electronic device 100 may output an activity state history in response to a specified input event or at a specified time (e.g., the last day of each month or a specified date). The activity state history, for example, may include normal activity states, exercise-required states (a day including a stationary state equal to or longer than a specified time), and good states (a day including an exercise activity state equal to or longer than a specified time) of one month.

As shown in FIG. 10, the display 100 may display, for each corresponding day, a first object 1010 corresponding to the normal activity state, a second object 1040 corresponding to the exercise-required state, and a third object 1030 corresponding to the good state. With reference to the activity state history, the user may intuitively understand days on which exercises were required and days on which exercises were performed with respect to one month.

Figure 11:
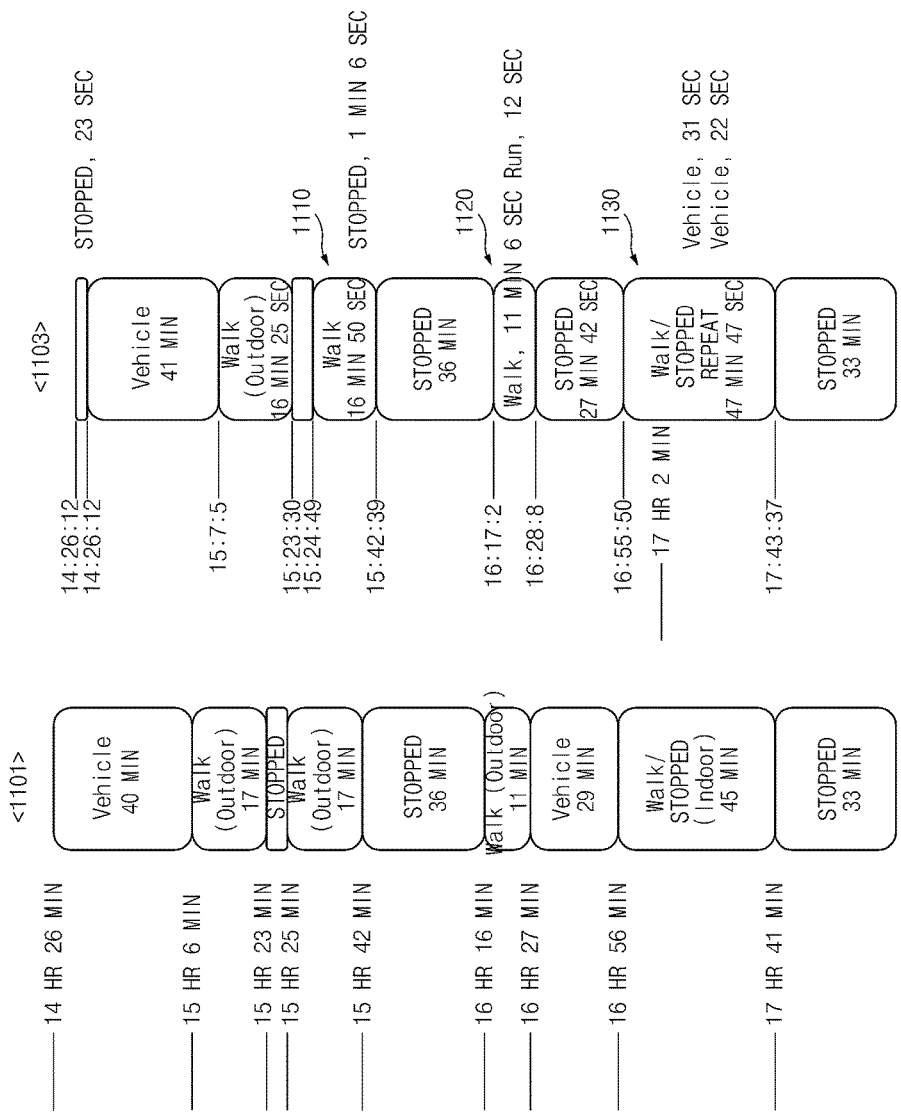
FIG. 11 is a diagram illustrating a display of a representative activity state according to an embodiment of the present disclosure.

FIG. 11 is a diagram illustrating a display of a representative activity state according to an embodiment of the present disclosure. A state 1101 may correspond to information in which user's actual activity states are recorded. For example, the user may use a vehicle for 40 minutes, may walk for 17 minutes, may stay for 2 minutes, and then may walk for 17 minutes. Thereafter, the user may stay for 36 minutes, may walk for 11 minutes, may use a vehicle for 29 minutes, may repeat walking/stopped (i.e., stationary) for 45 minutes, and then stopped for 33 minutes.

In response to the above-mentioned actual activities, the electronic device 100 may collect sensor information using the sensor 140 during the actual activity states, and may extract activity state changes based on pieces of collected sensor information as shown in a state 1103. Here, the electronic device 100 may collect sensor information for an activity state change in response to a user input, or may use sensor information automatically collected using the sensor 140 enabled, so as to detect an activity state change. In FIG. 11, it may be understood that activity state changes similar to the actual activity changes are detected since the activity state changes collected by the electronic device 100 correspond to the actual activity states. In an example, even if sensor information corresponding to a stationary state for 1 minute and 6 seconds is collected in a walking 1110, the electronic device 100 may determine a walking activity state as a representative activity state based on a relative ratio of pieces of sensor information corresponding to a walking activity state in a corresponding activity state. Even if sensor information corresponding to a state of running for 21 seconds is collected in a walking 1120, the electronic device 100 may determine a walking activity state as a corresponding representative activity state according to sensor information corresponding to a walking activity state having a relatively high distribution compared to a running activity state. Even if sensor information corresponding to a state of using a vehicle for 31 seconds and for 22 seconds is collected in a walking/stationary 1130, the electronic device 100 may discard the sensor information corresponding to the vehicle using state or may regard it as an error since the walking/staying state has a relatively high distribution, and may determine the walking/staying activity state as a representative activity state.

FIG. 12 is a diagram illustrating session integration according to an embodiment of the present disclosure. Electronic device 100 may collect session information. As shown in FIG. 12, the session information may include, for example, first session information 1201, second session information 1202, third session information 1203, fourth session information 1204, fifth session information 1205, sixth session information 1206, and seventh session information 1207. The first session information 1201 may be a session corresponding to a stationary state. The second session information 1202 may be a session corresponding to a walking activity state.

The first session information, for example, may be information corresponding to sensor information between a start 1210 and an end 1230. The session end information 1230 may be adjusted according to next session start information. According to an embodiment of the present disclosure, in relation to the first session information, sensor information between 14 hours, 25 minutes, 32 seconds and 14 hours, 26 minutes, 33 seconds may be determined as a session corresponding to a stationary state. In FIG. 12, in the case where a stationary state (Activity 1) at 14 hours, 25 minutes, 32 seconds is changed to a walking activity state (e.g., Activity 2) at 14 hours, 26 minutes, 17 seconds, and the corresponding session is ended at 14 hours, 26 minutes, 33 seconds, walking activity state information of a period of 16 seconds between 14 hours, 26 minutes, 17 seconds and 14 hours, 26 minutes, 33 seconds may be integrated with a previous stationary state, so as to be registered as an integrated session 1241 corresponding to a stationary state.

In various embodiments, as shown in FIG. 12, the third session information 1203 may be changed from a stationary state (Activity 1) at 14 hours, 31 minutes, 40 seconds recorded in an item 1211 to a walking activity state (e.g., Activity 2) at 14 hours, 32 minutes, 10 seconds recorded in an item 1231, and the corresponding session may be ended at 14 hours, 32 minutes, 11 seconds as shown in 1233. In this case, walking activity state information corresponding to a period of 30 seconds between 14 hours, 31 minutes, 40 seconds and 14 hours, 32 minutes, 10 seconds may be integrated with a previous stationary state, so as to be registered as an integrated session corresponding to a stationary state.

The above-mentioned session division (e.g., between 1210 and 1230), for example, may be performed in response to specified period arrival, an event of turning on a display, an event of receiving a request from a specified application, an event of receiving an external input, etc.

As described above, during a process of dividing sessions with respect to pieces of collected sensor information, the electronic device 100 may integrate a current session with a previous session if the current session has a time size equal to or larger than a specified time size and is identical to a previous session with respect to an activity state, or the electronic device 100 may treat the current session as a new session if the current session is different from the previous session. If the activity state of the current session is different from that of the previous session and has a time size equal to or smaller than the specified time, the electronic device 100 may treat the current session as a new session or may integrate the current session with the previous session according to existence of a previously stored temporary session.

According to the above-mentioned various embodiments of the present disclosure, an electronic device according to an embodiment of the present disclosure may include a memory, a display, and a processor, wherein the processor may determine one of different activity states detected based on sensor information corresponding to a specified time range as a representative activity state corresponding to the time range, and may output, to the display, information corresponding to the representative activity state.

An electronic device according to an embodiment of the present disclosure may include a memory, a display, and a processor, wherein the processor may determine an activity state value which appears over a relatively long time range, among different activity state values indicated by pieces of sensor information corresponding to a certain time range, as a representative activity state, and may output, to the display, information corresponding to the representative activity state.

According to the above-mentioned various embodiments of the present disclosure, an electronic device according to an embodiment of the present disclosure may include a memory, a display, and a processor, wherein the processor may determine activity state history information for a reference time (e.g., 12 hours, 24 hours, or the like) according to a time size of a specified activity state value (e.g., an exercise state, a stationary state, or the like) among different activity state values which have occurred within the reference time, based on session information collected during the reference time, and may output, to the display, display information corresponding to the activity state history information. According to various embodiments of the present disclosure, the processor may output, to the display, pieces of activity state history information corresponding to a plurality of reference times (e.g., one week or one month).

According to the above-mentioned various embodiments of the present disclosure, an electronic device according to an embodiment of the present disclosure may include a memory, a display, and a processor, wherein the processor may output, to the display, a circular user interface including sections corresponding to different activity state values indicated by pieces of sensor information collected during a specified reference time (e.g., one day), and may output at least one of an activity state type, an activity state maintaining time, or an activity state start time corresponding to a specific section in response to indication (or selection) of the specific section. According to various embodiments of the present disclosure, the processor may apply, as a representative activity state value, an activity state value having a relatively high ratio among different activity state values detected from pieces of sensor information corresponding to the section. According to various embodiments of the present disclosure, the processor may display the section with different colors or different shapes according to the types of representative activity state values.

Figure 13:
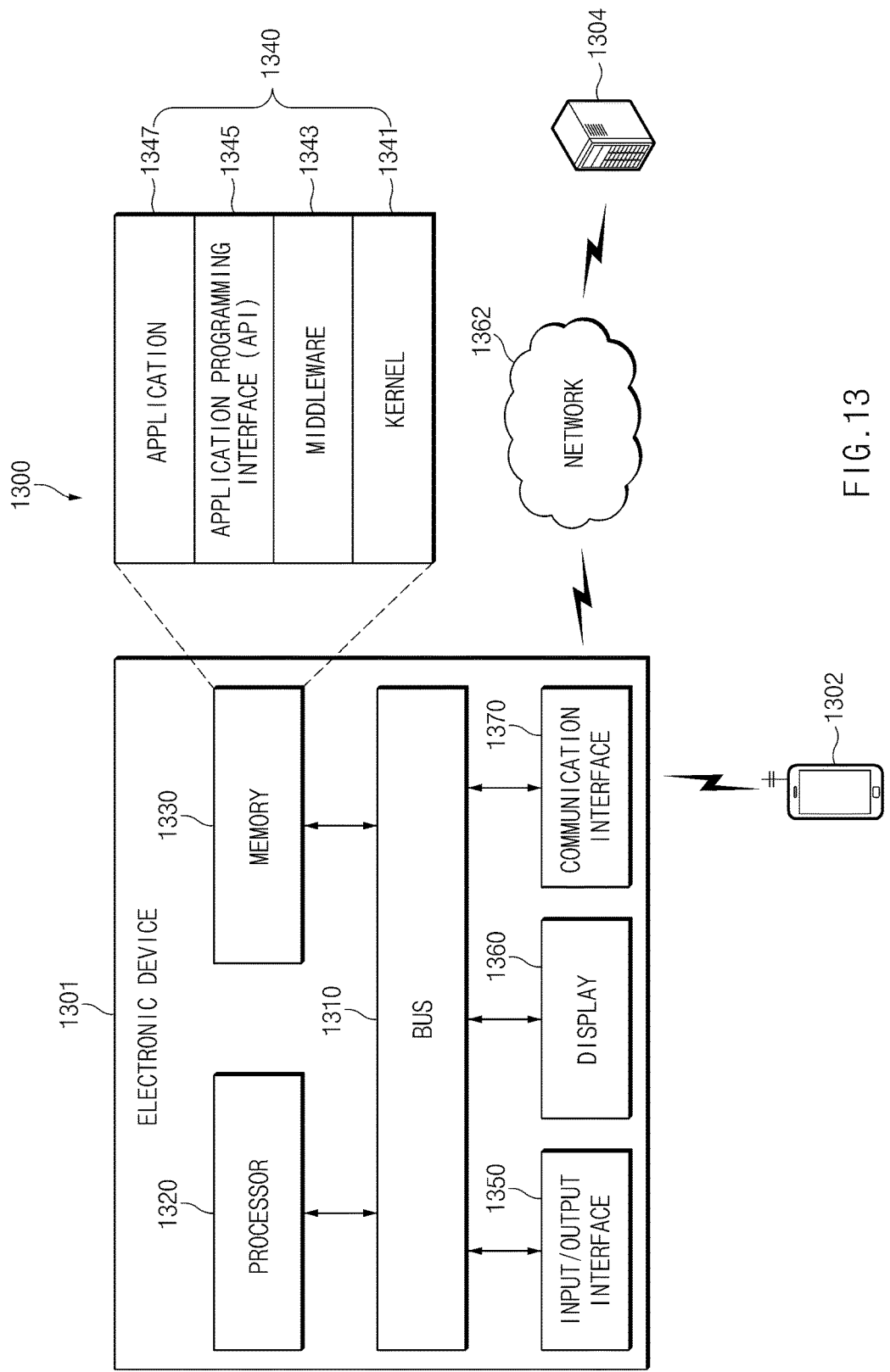
FIG. 13 is a diagram illustrating an electronic device operating environment according to an embodiment of the present disclosure.

FIG. 13 is a diagram illustrating an electronic device operating environment according to an embodiment of the present disclosure. In an electronic device operating environment 1300, an electronic device 1301 or 1302 of various embodiments of the present disclosure or a server 1304 may be connected to each other via a network 1362 or short-range communications. The electronic device 1301 may include a bus 1310, a processor 1320, a memory 1330, an input/output interface 1350, a display 1360, and a communication interface 1370. In some various embodiments of the present disclosure, at least one of the foregoing elements may be omitted or another element may be added to the electronic device 1301. The electronic device 1301 may correspond to the second electronic device 100b or the first electronic device 100a, and the electronic device 1302 may correspond to the first electronic device 100a.

The bus 1310 may include a circuit for connecting the above-mentioned elements 1310 to 1370 to each other and transferring communications (e.g., control messages and/or data) among the above-mentioned elements.

The processor 1320 may include at least one of a central processing unit (CPU), an application processor (AP), or a communication processor (CP). The processor 1320 may perform data processing or an operation related to communication and/or control of at least one of the other elements of the electronic device 1301.

The memory 1330 may include a volatile memory and/or a nonvolatile memory. The memory 1330 may store instructions or data related to at least one of the other elements of the electronic device 1301. Memory 1330 may store software and/or a program 1340. The program 1340 may include, for example, a kernel 1341, a middleware 1343, an application programming interface (API) 1345, and/or an application program (or an application) 1347. At least a portion of the kernel 1341, the middleware 1343, or the API 1345 may be referred to as an operating system (OS).

The kernel 1341 may control or manage system resources (e.g., the bus 1310, the processor 1320, the memory 1330, or the like) used to perform operations or functions of other programs (e.g., the middleware 1343, the API 1345, or the application program 1347). Furthermore, the kernel 1341 may provide an interface for allowing the middleware 1343, the API 1345, or the application program 1347 to access individual elements of the electronic device 1301 in order to control or manage the system resources.

The middleware 1343 may serve as an intermediary so that the API 1345 or the application program 1347 communicates and exchanges data with the kernel 1341. Furthermore, the middleware 1343 may handle one or more task requests received from the application program 1347 according to a priority order. For example, the middleware 1343 to may assign at least one application program 1347 a priority for using the system resources (e.g., the bus 1310, the processor 1320, the memory 1330, or the like) of the electronic device 1301. For example, the middleware 1343 may handle the one or more task requests according to the priority assigned to the at least one application, thereby performing scheduling or load balancing with respect to the one or more task requests.

The API 1345, which is an interface for allowing the application 1347 to control a function provided by the kernel 1341 or the middleware 1343, may include, for example, at least one interface or function (e.g., instructions) for file control, window control, image processing, character control, or the like.

The input/output interface 1350 may serve to transfer an instruction or data input from a user or another external device to another element(s) of the electronic device 1301. Furthermore, the input/output interface 1350 may output instructions or data received from another element(s) of the electronic device 1301 to the user or another external device.

The display 1360 may include, for example, a liquid crystal display (LCD), alight-emitting diode (LED) display, an organic light-emitting diode (OLED) display, a microelectromechanical systems (MEMS) display, or an electronic paper display. The display 1360 may present various content (e.g., a text, an image, a video, an icon, a symbol, or the like) to the user. The display 1360 may include a touch screen, and may receive a touch, gesture, proximity or hovering input from an electronic pen or a part of a body of the user.

The communication interface 1370 may set communications between the electronic device 1301 and an external device (e.g., the first external electronic device 1302 or the server 1304). For example, the communication interface 1370 may be connected to the network 1362 via wireless or wired communications so as to communicate with the external device (e.g., the server 1304).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). Furthermore, the wireless communications may include, for example, short-range communications. The short-range communications may include at least one of wireless fidelity (Wi-Fi), Bluetooth, near field communication (NFC), magnetic stripe transmission (MST), or GNSS. The MST may generate pulses according to transmission data using electromagnetic signals, and the pulses may generate magnetic signals. The electronic device 1301 may transmit the magnetic signals to a point of sales (POS), and the POS may detect the magnetic signals using an MST reader, and may convert detected magnetic signals into electric signals to thereby restore the data.

The GNSS may include, for example, at least one of global positioning system (GPS), global navigation satellite system (GLONASS), BeiDou navigation satellite system (hereinafter referred to as "BeiDou"), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 1362 may include at least one of telecommunications networks, for example, a computer network (e.g., a LAN or WAN), the Internet, or a telephone network.

The type of the first external electronic device 1302 may be the same as or different from that of the electronic device 1301. In some cases, server 1304 may include a group of one or more servers. In various embodiments, a portion or all of operations performed in the electronic device 1301 may be performed in one or more other electronic devices (e.g., the electronic device 1302 or the server 1304). In an exemplary case where the electronic device 1301 is required to perform a certain function or service automatically or in response to a request, the electronic device 1301 may request at least a portion of functions related to the function or service from another device (e.g., the electronic device 1302 or the server 1304) instead of or in addition to performing the function or service for itself. The other electronic device (e.g., the electronic device 1302 or the server 1304) may perform the requested function or additional function, and may transfer a result of the performance to the electronic device 1301. The electronic device 1301 may intactly use or additionally process a received result to provide the requested function or service. To this end, for example, a cloud computing technology, a distributed computing technology, or a client-server computing technology may be used.

Figure 14:
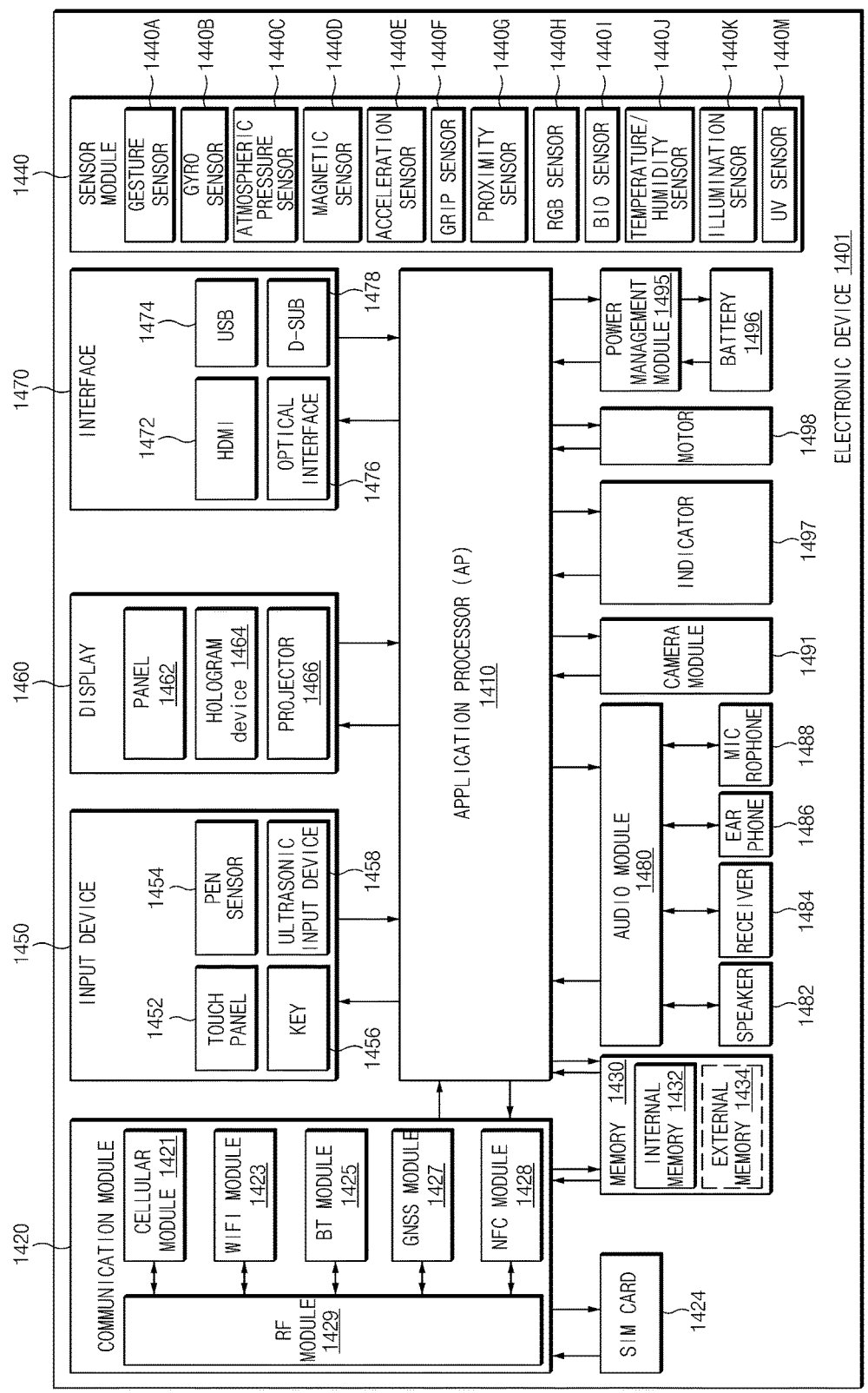
FIG. 14 is a block diagram illustrating an electronic device according to various embodiments of the present disclosure.

FIG. 14 is a block diagram illustrating an electronic device 1401 according to various embodiments of the present disclosure. The electronic device 1401 may include, for example, a part or the entirety of the first and second electronic devices 100a and 100b of FIG. 1 and the electronic device 1301 of FIG. 13. The electronic device 1401 may include at least one processor (e.g., an application processor (AP)) 1410, a communication module 1420, a subscriber identification module 1429, a memory 1430, a sensor module 1440, an input device 1450, a display 1460, an interface 1470, an audio module 1480, a camera module 1491, a power management module 1495, a battery 1496, an indicator 1497, and a motor 1498.

The processor 1410 may run an operating system or an application program so as to control a plurality of hardware or software elements connected to the processor 1410, and may process various data and perform operations. The processor 1410 may be implemented with, for example, a system on chip (SoC). According to an embodiment of the present disclosure, the processor 1410 may further include a graphic processing unit (GPU) and/or an image signal processor. The processor 1410 may load, on a volatile memory, an instruction or data received from at least one of other elements (e.g., a nonvolatile memory) to process the instruction or data, and may store various data in a nonvolatile memory.

The communication module 1420 may include, for example, a cellular module 1421, a Wi-Fi module 1422, a Bluetooth module 1423, a GNSS module 1424 (e.g., a GPS module, a GLONASS module, a BeiDou module, or a Galileo module), an NFC module 1425, an MST module 1426, and a radio frequency (RF) module 1427.

The cellular module 1421 may provide, for example, a voice call service, a video call service, a text message service, or an Internet service through a communication network. Cellular module 1421 may identify and authenticate the electronic device 1401 in the communication network using the subscriber identification module 1424 (e.g., a SIM card). Cellular module 1421 may perform at least a part of functions providable by the processor 1410. Cellular module 1421 may include a communication processor (CP).

Each of the Wi-Fi module 1422, the Bluetooth module 1423, the GNSS module 1424, the NFC module 1425, and the MST module 1426 may include, for example, a processor for processing data transmitted/received through the modules. In some cases, at least a portion (e.g., at least two) of the cellular module 1421, the Wi-Fi module 1422, the Bluetooth module 1423, the GNSS module 1424, the NFC module 1425, and the MST module 1426 may be included in a single integrated chip (IC) or IC package.

The RF module 1427 may transmit/receive, for example, communication signals (e.g., RF signals). The RF module 1427 may include, for example, a transceiver, a power amp module (PAM), a frequency filter, a low noise amplifier (LNA), an antenna, or the like. According to another embodiment of the present disclosure, at least one of the cellular module 1421, the Wi-Fi module 1422, the Bluetooth module 1423, the GNSS module 1424, the NFC module 1425, or the MST module 1426 may transmit/receive RF signals through a separate RF module.

The subscriber identification module 1429 may include, for example, an embedded SIM and/or a card containing a subscriber identification module, and may include unique identification information (e.g., an integrated circuit card identifier (ICCID)) or subscriber information (e.g., international mobile subscriber identity (IMSI)).

The memory 1430 may include an internal memory 1432 or an external memory 1434. The internal memory 1432 may include at least one of a volatile memory (e.g., a dynamic RAM (DRAM), a static RAM (SRAM), a synchronous dynamic RAM (SDRAM), or the like) or a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like), a hard drive, or a solid state drive (SSD)).

The external memory 1434 may include a flash drive, for example, compact flash (CF), secure digital (SD), micro secure digital (Micro-SD), mini secure digital (Mini-SD), extreme digital (xD), multi-media card (MMC), a memory stick, or the like. The external memory 1434 may be operatively and/or physically connected to the electronic device 1401 through various interfaces.

The sensor module 1440 may, for example, measure physical quantity or detect an operation state of the electronic device 1401 so as to convert measured or detected information into an electrical signal. The sensor module 1440 may include, for example, at least one of a gesture sensor 1440A, a gyro sensor 1440B, a barometric pressure sensor 1440C, a magnetic sensor 1440D, an acceleration sensor 1440E, a grip sensor 1440F, a proximity sensor 1440G a color sensor 1440H (e.g., a red/green/blue (RGB) sensor), a biometric sensor 1440I, a temperature/humidity sensor 1440J, an illumination sensor 1440K, or an ultraviolet (UV) sensor 1440M. Additionally or alternatively, the sensor module 1440 may include, for example, an olfactory sensor (E-nose sensor), an electromyography (EMG) sensor, an electroencephalogram (EEG) sensor, an electrocardiogram (ECG) sensor, an infrared (IR) sensor, an iris sensor, and/or a fingerprint sensor. The sensor module 1440 may further include a control circuit for controlling at least one sensor included therein. In some various embodiments of the present disclosure, the electronic device 1401 may further include a processor configured to control the sensor module 1440 as a part of the processor 1410 or separately, so that the sensor module 1440 is controlled while the processor 1410 is in a sleep state.

The input device 1450 may include, for example, a touch panel 1452, a (digital) pen sensor 1454, a key 1456, or an ultrasonic input device 1458. The touch panel 1452 may employ at least one of capacitive, resistive, infrared, and ultraviolet sensing methods. The touch panel 1452 may further include a control circuit. The touch panel 1452 may further include a tactile layer so as to provide a haptic feedback to a user.

The (digital) pen sensor 1454 may include, for example, a sheet for recognition which is a part of a touch panel or is separate. The key 1456 may include, for example, a physical button, an optical button, or a keypad. The ultrasonic input device 1458 may sense ultrasonic waves generated by an input tool through a microphone (e.g., a microphone 1488) so as to identify data corresponding to the ultrasonic waves sensed.

The display 1460 (e.g., the display 160 or the display 1360) may include a panel 1462, a hologram device 1464, or a projector 1466. The panel 1462 may have a configuration that is the same as or similar to that of the display 160 of FIG. 2 or the display 1360 of FIG. 13. The panel 1462 may be, for example, flexible, transparent or wearable. The panel 1462 and the touch panel 1452 may be integrated into a single module. The hologram device 1464 may display a stereoscopic image in a space using a light interference phenomenon. The projector 1466 may project light onto a screen so as to display an image. The screen may be disposed in the inside or the outside of the electronic device 1401. Display 1460 may further include a control circuit for controlling the panel 1462, the hologram device 1464, or the projector 1466.

The interface 1470 may include, for example, a high-definition multimedia interface (HDMI) 1472, a universal serial bus (USB) 1474, an optical interface 1476, or a D-subminiature (D-sub) 1478. Additionally or alternatively, the interface 1470 may include, for example, a mobile high-definition link (MHL) interface, a secure digital (SD) card/multi-media card (MMC) interface, or an infrared data association (IrDA) interface.

The audio module 1480 may convert, for example, a sound into an electrical signal or vice versa. The audio module 1480 may process sound information input or output through a speaker 1482, a receiver 1484, an earphone 1486, or the microphone 1488.

Camera module 1491 for shooting a still image or a video may include, for example, at least one image sensor (e.g., a front sensor or a rear sensor), a lens, an image signal processor (ISP), or a flash (e.g., an LED or a xenon lamp).

The power management module 1495 may manage power of the electronic device 1401. According to an embodiment of the present disclosure, the power management module 1495 may include a power management integrated circuit (PMIC), a charger integrated circuit (IC), or a battery or fuel gauge. The PMIC may employ a wired and/or wireless charging method. The wireless charging method may include, for example, a magnetic resonance method, a magnetic induction method, or an electromagnetic method, or the like. An additional circuit for wireless charging, such as a coil loop, a resonant circuit, a rectifier, or the like, may be further included. The battery gauge may measure, for example, a remaining capacity of the battery 1496 and a voltage, current or temperature thereof while the battery is charged. The battery 1496 may include, for example, a rechargeable battery and/or a solar battery. The indicator 1497 may display a specific state of the electronic device 1401 or a part thereof (e.g., the processor 1410), such as a booting state, a message state, a charging state, or the like. The motor 1498 may convert an electrical signal into a mechanical vibration, and may output (or generate) a vibration or haptic effect. Although not illustrated, a processing device (e.g., a GPU) for supporting a mobile TV may be included in the electronic device 1401. The processing device for supporting a mobile TV may process media data according to the standards of digital multimedia broadcasting (DMB), digital video broadcasting (DVB), Media-FLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

Figure 15:
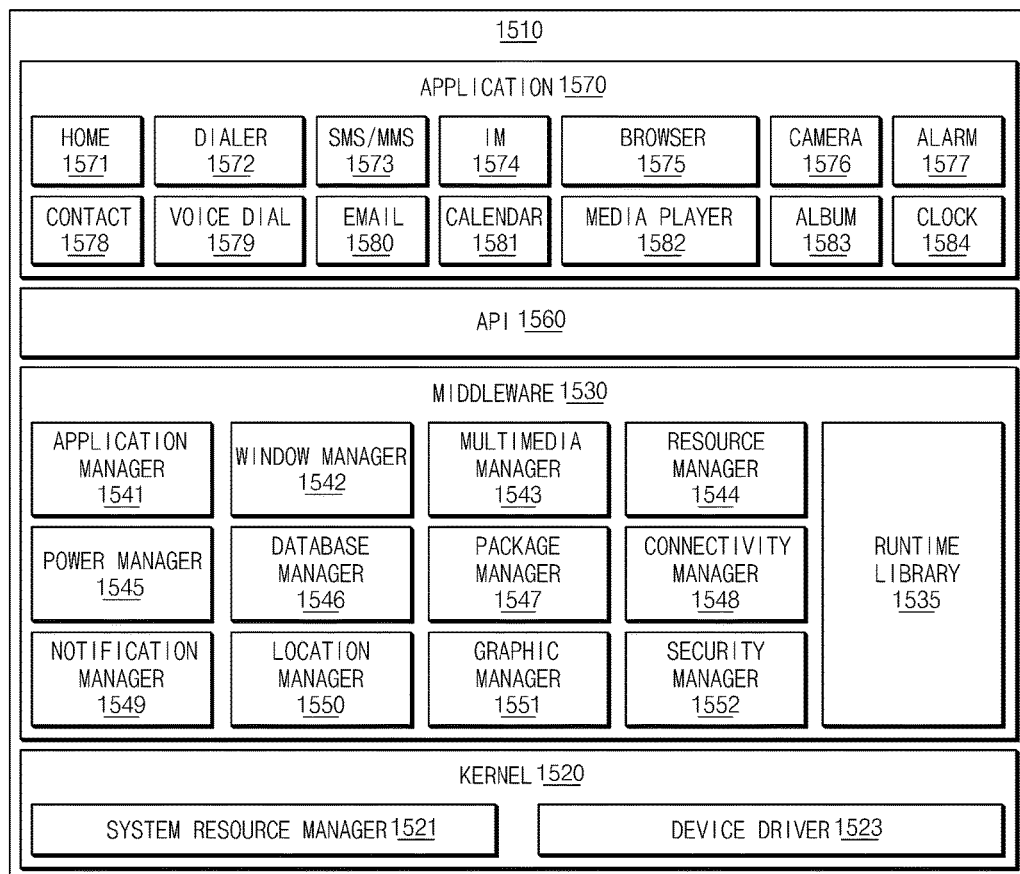
FIG. 15 is a block diagram illustrating a program module according to various embodiments of the present disclosure.

FIG. 15 is a block diagram illustrating a program module according to various embodiments of the present disclosure. According to an embodiment of the present disclosure, a program module 1510 may include an operating system (OS) for controlling a resource related to an electronic device (e.g., the electronic device 100, the electronic device 1301, or the electronic device 1401) and/or various applications running on the OS. The operating system may be, for example, Android, iOS, Windows, Symbian, Tizen, Bada, or the like.

The program module 1510 may include a kernel 1520, a middleware 1530, an application programming interface (API) 1560, and/or an application 1570. At least a part of the program module 1510 may be preloaded on the electronic device or may be downloaded from an external electronic device.

The kernel 1520 may include, for example, a system resource manager 1521 and/or a device driver 1523. The system resource manager 1521 may perform control, allocation, or retrieval of a system resource. According to an embodiment of the present disclosure, the system resource manager 1521 may include a process management unit, a memory management unit, a file system management unit, or the like. The device driver 1523 may include, for example, a display driver, a camera driver, a Bluetooth driver, a shared memory driver, a USB driver, a keypad driver, a Wi-Fi driver, an audio driver, or an inter-process communication (IPC) driver.

The middleware 1530, for example, may provide a function that the applications 1570 require in common, or may provide various functions to the applications 1570 through the API 1560 so that the applications 1570 may efficiently use limited system resources in the electronic device. Middleware 1530 may include at least one of a runtime library 1535, an application manager 1541, a window manager 1542, a multimedia manager 1543, a resource manager 1544, a power manager 1545, a database manager 1546, a package manager 1547, a connectivity manager 1548, a notification manager 1549, a location manager 1550, a graphic manager 1551, or a security manager 1552.

The runtime library 1535 may include, for example, a library module that a complier uses to add a new function through a programming language while the application 1570 is running. The runtime library 1535 may perform a function for input/output management, memory management, or an arithmetic function.

The application manager 1541 may mange, for example, a life cycle of at least one of the applications 1570. The window manager 1542 may manage a GUI resource used in a screen. The multimedia manager 1543 may recognize a format required for playing various media files and may encode or decode a media file using a codec matched to the format. The resource manager 1544 may manage a resource such as a source code, a memory, or a storage space of at least one of the applications 1570.

The power manager 1545, for example, may operate together with a basic input/output system (BIOS) to manage a battery or power and may provide power information required for operating the electronic device. The database manager 1546 may generate, search, or modify a database to be used in at least one of the applications 1570. The package manager 1547 may manage installation or update of an application distributed in a package file format.

The connectivity manger 1548 may manage wireless connection of Wi-Fi, Bluetooth, or the like. The notification manager 1549 may display or notify an event such as message arrival, appointments, and proximity alerts in such a manner as not to disturb a user. The location manager 1550 may manage location information of the electronic device. The graphic manager 1551 may manage a graphic effect to be provided to a user or a user interface related thereto. The security manager 1552 may provide various security functions required for system security or user authentication. According to an embodiment of the present disclosure, in the case in which an electronic device (e.g., the electronic device 100 or the electronic device 1301) includes a phone function, the middleware 1530 may further include a telephony manager for managing a voice or video call function of the electronic device.

The middleware 1530 may include a middleware module for forming a combination of various functions of the above-mentioned elements. The middleware 1530 may provide a module specialized for each type of an operating system to provide differentiated functions. Furthermore, the middleware 1530 may delete a part of existing elements or may add new elements dynamically.

The API 1560 which is, for example, a set of API programming functions may be provided in different configurations according to an operating system. For example, in the case of Android or iOS, one API set may be provided for each platform, and, in the case of Tizen, at least two API sets may be provided for each platform.

The application 1570, for example, may include at least one application for providing functions such as a home 1571, a dialer 1572, an SMS/MMS 1573, an instant message (IM) 1574, a browser 1575, a camera 1576, an alarm 1577, a contact 1578, a voice dial 1579, an e-mail 1580, a calendar 1581, a media player 1582, an album 1583, a clock 1584, health care (e.g., measure an exercise amount or blood sugar), or environmental information provision (e.g., provide air pressure, humidity, or temperature information).

Application 1570 may include an application (hereinafter referred to as an "information exchange application") for supporting information exchange between the electronic device (e.g., the electronic device 100 or the electronic device 1301) and an external electronic device. The information exchange application may include, for example, a notification relay application for relaying specific information to the external electronic device or a device management application for managing the external electronic device.

For example, the notification relay application may have a function for relaying, to an external electronic device, notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of an external electronic device itself (or some elements) or the brightness (or resolution) adjustment of a display) of the external electronic device communicating with the electronic device, an application running in the external electronic device, or a service (e.g., a call service or a message service) provided from the external electronic device.

According to an embodiment of the present disclosure, the application 1570 may include a specified application (e.g., a healthcare application of a mobile medical device) according to an attribute of the external electronic device. According to an embodiment of the present disclosure, the application 1570 may include an application received from the external electronic device. According to an embodiment of the present disclosure, the application 1570 may include a preloaded application or a third-party application downloadable from a server. The names of the elements of the program module 1510 illustrated may vary with the type of an operating system.

According to various embodiments of the present disclosure, at least a part of the program module 1510 may be implemented with software, firmware, hardware, or a combination thereof. At least a part of the program module 1510, for example, may be implemented (e.g., executed) by a processor (e.g., the processor 120 or the processor 1410). At least a part of the program module 1510 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 120), the processor may perform functions corresponding to the instructions. The computer-readable storage medium may be, for example, the memory 130.

A computer-readable recording medium may include a hard disk, a floppy disk, a magnetic medium (e.g., a magnetic tape), an optical medium (e.g., CD-ROM, digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters. The above-mentioned hardware device may be configured to be operated as one or more software modules for performing operations of various embodiments of the present disclosure and vice versa.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to various embodiments of the present disclosure, a difference between an actual activity of a user and information provided by an electronic device may be minimized so that an actual activity state may be recognized intuitively.

Furthermore, according to various embodiments of the present disclosure, information processing may be simplified so that information may be managed with ease and information may be displayed in an easy-to-understand form.

The above embodiments of the present disclosure are illustrative and not limitative. Various alternatives and equivalents are possible. Other additions, subtractions, or modifications are obvious in view of the present disclosure and are intended to fall within the scope of the appended claims.

What is claimed is:

1. An electronic device comprising:
a housing;
a sensor included in the housing and configured to sense a movement of the electronic device;
a processor electrically connected to the sensor; and
a memory storing instructions that, when executed by the processor, cause the processor to:
receive, from the sensor during a first time period, first sensing data indicating occurrence of a first activity of a user of the electronic device;
receive, from the sensor during a second time period, second sensing data indicating occurrence of a second activity of the user, wherein the second activity is different from the first activity; and
output information indicating that the first activity, without the second activity that is different from the first activity, has occurred throughout a third time period encompassing the first and second time periods, if the processor determines that the first activity was the most prevalent activity throughout the third time period.

2. The electronic device of claim 1, wherein the second time period is shorter than the first time period, the first activity corresponds to a first rate of exercise activity, and the second activity is defined by a second rate of exercise activity.

3. The electronic device of claim 1, further comprising:
a display electrically connected to the processor,
wherein the instructions cause the processor to:
display, on the display, a user interface for displaying an activity of the user; and
display, on the user interface, occurrence of the first activity during the second time period based on the information.

4. The electronic device of claim 3,
wherein the user interface displays an item including a line, a band, or a curve extending as a function of time, and
wherein the instructions cause the processor to display occurrence of the first activity during the first and second time periods displayed on the item.

5. The electronic device of claim 1, wherein the first sensing data represents activity values larger than a first threshold value, and the second sensing data represents activity values smaller than the first threshold value, respectively.

6. The electronic device of claim 5, wherein the first threshold value is variable based at least partially on information of the user.

7. The electronic device of claim 5, wherein the instructions cause the processor to:
receive, from the sensor, a plurality of sensing data during a selected period of time;
determine a first number indicating a number of data points having a value equal to or larger than the first threshold value and a second number indicating a number of data points having a value equal to or smaller than the first threshold value among the plurality of sensing data; and
select one of the first activity and the second activity as a representative activity during the selected period of time at least partially based on the determination.

8. The electronic device of claim 7, wherein only information indicative of the representative activity is output on a display of the electronic device, in association with the selected period of time.

9. The electronic device of claim 1, wherein the first activity comprises a running activity of the user, and the second activity comprises a walking activity of the user.

10. The electronic device of claim 1, wherein the instructions cause the processor to determine a representative detailed item of the first activity according to a pattern of sensing data of the first activity, and output information corresponding to a determined representative detailed item.

11. A method for processing activity information of an electronic device, the method comprising:
receiving, from a sensor during a first time period, first sensing data indicating occurrence of a first activity of a user of the electronic device;
receiving, from the sensor during a second time period, second sensing data indicating occurrence of a second activity of the user, wherein the second activity is different from the first activity; and
outputting information indicating that the first activity, but not the second activity that is different from the first activity, has occurred throughout a third time period encompassing the first and second time periods, if the first activity was the most prevalent activity throughout the third time period.

12. The method of claim 11, wherein the second time period is shorter than the first time period, the first activity corresponds to a first rate of exercise activity, and the second activity is defined by a second rate of exercise activity.

13. The method of claim 12, further comprising:
displaying, on a display, a user interface for displaying an activity of the user; and
displaying, on the user interface, occurrence of the first activity during the second time period based on the information.

14. The method of claim 13, wherein the displaying comprises at least one of:
displaying an item including at least one of a line, a band, or a curve extending according to a time; and
displaying occurrence of the first activity during the first period of time and the second period of time displayed on the item.

15. The method of claim 11, further comprising classifying sensor information received from the sensor as the first sensing data if the sensing data is equal to or larger than a specified threshold value and classifying the sensor information received from the sensor as the second sensing data if the sensing data is smaller than the threshold value.

16. The method of claim 15, further comprising changing the specified threshold value at least partially based on information of the user.

17. The method of claim 15, further comprising:
receiving, from the sensor, a plurality of sensing data during a selected period of time;
determining a first number indicating a number of data points having a value equal to or larger than the first threshold value and a second number indicating a number of data points having a value equal to or smaller than the first threshold value among the plurality of sensing data; and
selecting one of the first activity and the second activity as a representative activity during the selected period of time at least partially based on the determination.

18. The method of claim 17, wherein the selecting comprises:
comparing the first number with the second number; and
selecting one of the first activity and the second activity as the representative activity during the selected period of time at least partially based on a result of the comparison.

19. The method of claim 11, wherein the outputting comprises determining a representative detailed item of the first activity according to a pattern of sensing data of the first activity and outputting information corresponding to a determined representative detailed item.

20. An electronic device comprising:
a housing;
a sensor included in the housing and configured to sense a movement of the electronic device;
a processor electrically connected to the sensor; and
a memory storing instructions that, when executed by the processor, cause the processor to:
divide, when sensor information corresponding to occurrence of an activity having at least a specified magnitude is collected during a specified time range, the collected sensor information by a specified unit time;
determine types of activity states of the specified unit times;
determine a specific activity state as a representative activity state of the specified time range based on distribution of the activity states of the specified unit times; and
output information corresponding to a determined representative activity state, wherein the output information comprises information based on the sum of an application of a weight to the representative activity state and application of another weight to another representative activity.

* * * * *

UNITED STATES PATENT AND TRADEMARK OFFICE
CERTIFICATE OF CORRECTION

PATENT NO. : 10,275,200 B2  
APPLICATION NO. : 15/227042  
DATED : April 30, 2019  
INVENTOR(S) : Jeong Gwan Kang et al.

Page 1 of 1

It is certified that error appears in the above-identified patent and that said Letters Patent is hereby corrected as shown below:

On the Title Page

Item (72), Line 2, please change the 2nd inventor's name to read as follows:  
--...Byeong Jun Lee...--

Signed and Sealed this  
Twenty-sixth Day of November, 2019

Andrei Iancu  
*Director of the United States Patent and Trademark Office*